(12) United States Patent
Nielsen et al.

(10) Patent No.: US 9,208,464 B2
(45) Date of Patent: *Dec. 8, 2015

(54) METHODS AND APPARATUS FOR ANALYZING LOCATE AND MARKING OPERATIONS WITH RESPECT TO HISTORICAL INFORMATION

(75) Inventors: Steven E. Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 313 days.

This patent is subject to a terminal disclaimer.

(21) Appl. No.: 12/572,202

(22) Filed: Oct. 1, 2009

(65) Prior Publication Data
US 2010/0088134 A1 Apr. 8, 2010

Related U.S. Application Data

(63) Continuation-in-part of application No. 12/493,109, filed on Jun. 26, 2009, and a continuation-in-part of application No. 12/569,192, filed on Sep. 29, 2009, which is a continuation-in-part of application No.
(Continued)

(51) Int. Cl.
*G06Q 10/10* (2012.01)
*G06Q 50/16* (2012.01)
(Continued)

(52) U.S. Cl.
CPC .......... *G06Q 10/06395* (2013.01); *G06Q 10/06* (2013.01); *G06Q 10/0639* (2013.01); *G06Q 10/06393* (2013.01); *G01C 15/00* (2013.01); *G06Q 50/165* (2013.01)

(58) Field of Classification Search
CPC ............... G06T 17/05; G06Q 10/0693; G06Q 10/06935; G06Q 10/0639
USPC ......... 705/7.38, 7.41, 7.39; 382/109; 702/5, 6
See application file for complete search history.

(56) References Cited

U.S. PATENT DOCUMENTS 4,208,653 A 6/1980 Abe
4,455,509 A 6/1984 Crum et al.
(Continued)

FOREIGN PATENT DOCUMENTS

CA 2386200 4/2000
CA 2435290 8/2002
(Continued)

OTHER PUBLICATIONS

Subsurface Utility Engineering, subsurfaceutilityengineering.com, retrieved from web.archive.org, Aug. 28, 2008, p. 1-38.*
(Continued)

*Primary Examiner* — Ivan R Goldberg
(74) *Attorney, Agent, or Firm* — Cooley LLP

(57) ABSTRACT

Methods, apparatus and systems including a computer comprising at least one hardware processor, at least one tangible storage medium (memory), and at least one input/output (I/O) interface for evaluating a quality of a first locate and/or marking operation to identify a presence or an absence of at least one underground facility. First information relating to the first locate and/or marking operation is compared to second information relating to at least one second locate and/or marking operation different from the first locate and/or marking operation. One or more indications of a quality assessment of the locate and/or marking operation is automatically generated based on such a comparison, and the one or more indications of the quality assessment are electronically stored on the at least one tangible storage medium, and/or electronically transmitted via the at least one I/O interface, so as to provide an electronic record of the quality assessment.

27 Claims, 15 Drawing Sheets

Related U.S. Application Data

12/568,087, filed on Sep. 28, 2009, which is a continuation-in-part of application No. 12/539,497, filed on Aug. 11, 2009.

(60) Provisional application No. 61/102,186, filed on Oct. 2, 2008, provisional application No. 61/102,122, filed on Oct. 2, 2008, provisional application No. 61/102,151, filed on Oct. 2, 2008, provisional application No. 61/102,205, filed on Oct. 2, 2008.

(51) Int. Cl.
*G01C 15/00* (2006.01)
*G06Q 10/06* (2012.01)

(56) References Cited

U.S. PATENT DOCUMENTS

| | | |
|---|---|---|
| 4,550,376 A | 10/1985 | Maciejczak |
| 5,103,920 A | 4/1992 | Patton |
| 5,486,067 A | 1/1996 | Huynh |
| 5,918,565 A | 7/1999 | Casas |
| 6,074,693 A | 6/2000 | Manning |
| 6,138,906 A | 10/2000 | DeMayo |
| 6,169,517 B1 | 1/2001 | Eslambolchi et al. |
| 6,353,767 B1 | 3/2002 | Wakeman et al. |
| 6,421,725 B1 | 7/2002 | Vermilyea et al. |
| 6,437,708 B1 | 8/2002 | Brouwer |
| 6,512,312 B1 | 1/2003 | Herkenrath et al. |
| 6,526,443 B1 | 2/2003 | Goldsmith et al. |
| 6,526,526 B1 | 2/2003 | Dong et al. |
| 6,578,005 B1 | 6/2003 | Lesaint et al. |
| 6,601,017 B1 | 7/2003 | Kennedy et al. |
| 6,684,250 B2 | 1/2004 | Anderson |
| 6,751,553 B2 | 6/2004 | Young |
| 6,751,554 B1 | 6/2004 | Asher et al. |
| 6,915,211 B2 | 7/2005 | Kram et al. |
| 6,938,048 B1 * | 8/2005 | Jilk et al. ................... 705/7.14 |
| 6,949,052 B2 | 9/2005 | Millington et al. |
| 6,958,690 B1 | 10/2005 | Asher et al. |
| 6,980,929 B2 | 12/2005 | Aronstam et al. |
| 6,996,210 B2 | 2/2006 | Esty et al. |
| 6,999,021 B2 | 2/2006 | Taylor, Jr. |
| 7,003,443 B2 | 2/2006 | Ford et al. |
| 7,003,475 B1 | 2/2006 | Friedland et al. |
| 7,079,990 B2 | 7/2006 | Haller et al. |
| 7,313,759 B2 | 12/2007 | Sinisi |
| 7,324,905 B2 | 1/2008 | Droubie et al. |
| 7,372,247 B1 | 5/2008 | Giusti et al. |
| 7,398,184 B1 | 7/2008 | Chen |
| 7,400,976 B2 | 7/2008 | Young et al. |
| 7,469,247 B2 | 12/2008 | Cossins et al. |
| 7,626,496 B1 | 12/2009 | Asher et al. |
| 7,640,105 B2 | 12/2009 | Nielsen et al. |
| 7,730,095 B2 | 6/2010 | Vishwanath et al. |
| 7,741,848 B1 | 6/2010 | Olsson |
| 7,773,095 B1 | 8/2010 | Badrak et al. |
| 7,889,124 B2 | 2/2011 | Islam et al. |
| 7,986,246 B2 | 7/2011 | Angelis et al. |
| 8,040,272 B1 | 10/2011 | Clodfelter et al. |
| 8,068,789 B2 | 11/2011 | Bell et al. |
| 8,069,412 B2 | 11/2011 | Bankston et al. |
| 8,077,072 B2 | 12/2011 | Mohamadi et al. |
| 8,127,865 B2 | 3/2012 | Watson et al. |
| 8,473,148 B2 | 6/2013 | Nielsen et al. |
| 8,480,332 B2 | 7/2013 | Miller |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,626,571 B2 | 1/2014 | Nielsen et al. |
| 8,700,325 B2 | 4/2014 | Nielsen et al. |
| 8,903,643 B2 | 12/2014 | Nielsen et al. |
| 2002/0029161 A1 | 3/2002 | Brodersen |
| 2002/0032028 A1 | 3/2002 | Kaupe |
| 2002/0038076 A1 | 3/2002 | Sheehan et al. |
| 2002/0055870 A1 | 5/2002 | Thomas |
| 2002/0153134 A1 | 10/2002 | Newman |
| 2002/0184235 A1 * | 12/2002 | Young et al. ................ 707/104.1 |
| 2003/0083073 A1 | 5/2003 | Cossins |
| 2003/0110184 A1 | 6/2003 | Gibson et al. |
| 2003/0130820 A1 | 7/2003 | Lane |
| 2003/0168834 A1 | 9/2003 | Ulrich |
| 2003/0177027 A1 | 9/2003 | DiMarco |
| 2003/0177051 A1 | 9/2003 | Driscoll et al. |
| 2003/0212621 A1 | 11/2003 | Poulter |
| 2003/0216949 A1 | 11/2003 | Kram et al. |
| 2004/0215701 A1 | 10/2004 | Vrajich |
| 2004/0236620 A1 | 11/2004 | Chauhan et al. |
| 2004/0260720 A1 | 12/2004 | Cossins |
| 2005/0004944 A1 | 1/2005 | Cossins |
| 2005/0033620 A1 | 2/2005 | Gloor et al. |
| 2005/0057745 A1 | 3/2005 | Bontje |
| 2005/0232475 A1 | 10/2005 | Floeder |
| 2005/0240649 A1 | 10/2005 | Elkington |
| 2006/0026020 A1 * | 2/2006 | Waite et al. .................. 705/1 |
| 2006/0077095 A1 * | 4/2006 | Tucker et al. ............. 342/357.08 |
| 2006/0085133 A1 | 4/2006 | Young et al. |
| 2006/0085396 A1 | 4/2006 | Evans |
| 2006/0091888 A1 | 5/2006 | Holman et al. |
| 2006/0206370 A1 | 9/2006 | Skopal |
| 2006/0235741 A1 | 10/2006 | Deaton et al. |
| 2006/0245572 A1 | 11/2006 | Asher |
| 2006/0282280 A1 | 12/2006 | Stotz et al. |
| 2007/0127694 A1 | 6/2007 | Hajj et al. |
| 2007/0219722 A1 | 9/2007 | Sawyer et al. |
| 2007/0288159 A1 | 12/2007 | Skelton |
| 2008/0001009 A1 | 1/2008 | Young |
| 2008/0017416 A1 | 1/2008 | Watson |
| 2008/0025614 A1 | 1/2008 | Hintz et al. |
| 2008/0121684 A1 | 5/2008 | Gualandri |
| 2008/0137589 A1 | 6/2008 | Barrett |
| 2008/0228294 A1 * | 9/2008 | Nielsen et al. ................ 700/58 |
| 2008/0245299 A1 | 10/2008 | Nielsen et al. |
| 2008/0288267 A1 | 11/2008 | Asher |
| 2009/0013928 A1 | 1/2009 | Nielsen et al. |
| 2009/0157746 A1 | 6/2009 | More et al. |
| 2009/0184823 A1 | 7/2009 | Tessier |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0223355 A1 | 9/2009 | Manders |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0265430 A1 | 10/2009 | Bechtel |
| 2009/0289637 A1 * | 11/2009 | Radtke ........................ 324/629 |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0034483 A1 | 2/2010 | Giuffrida |
| 2010/0084532 A1 | 4/2010 | Nielsen et al. |
| 2010/0085054 A1 | 4/2010 | Nielsen et al. |

(56) References Cited

U.S. PATENT DOCUMENTS

| | | |
|---|---|---|
| 2010/0085185 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0146454 A1 | 6/2010 | Sugahara |
| 2010/0164787 A1 | 7/2010 | Khosravy et al. |
| 2010/0170453 A1 | 7/2010 | Betzer-Zilevitch |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |
| 2013/0147637 A1 | 6/2013 | Nielsen et al. |
| 2013/0162431 A1 | 6/2013 | Nielsen et al. |
| 2013/0174072 A9 | 7/2013 | Nielsen et al. |
| 2013/0182009 A1 | 7/2013 | Nielsen et al. |
| 2013/0186333 A1 | 7/2013 | Nielsen et al. |
| 2013/0187942 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |

FOREIGN PATENT DOCUMENTS

| | | |
|---|---|---|
| CA | 2458050 | 3/2003 |
| CA | 2510111 | 7/2004 |
| CA | 2641355 | 8/2007 |
| JP | 2005327228 A | 11/2005 |
| JP | 2006189930 A | 7/2006 |
| WO | WO-9516827 | 6/1995 |
| WO | WO-0228541 | 4/2002 |
| WO | WO2006013338 | 2/2006 |

OTHER PUBLICATIONS

Common Ground Alliance, "Best Practices Version 5.0," Mar. 2008, pp. 1-98.*
International Search Report and Written Opinion, Application Serial No. PCT/2009/05416, Jun. 7, 2010.

(56) References Cited

OTHER PUBLICATIONS

International Search Report and Written Opinion, Application Serial No. PCT/2009/05443, Apr. 5, 2010.
U.S. Appl. No. 12/704,485, filed Feb. 11, 2010, Nielsen et al.
U.S. Appl. No. 12/833,103, filed Jul. 9, 2010, Nielsen et al.
U.S. Appl. No. 12/833,117, filed Jul. 9, 2010, Nielsen et al.
U.S. Appl. No. 12/833,121, filed Jul. 9, 2010, Nielsen et al.
U.S. Appl. No. 12/833,127, filed Jul. 9, 2010, Nielsen et al.
U.S. Appl. No. 12/850,187, filed Aug. 4, 2010, Nielsen et al.
U.S. Appl. No. 12/850,712, filed Aug. 5, 2010, Nielsen et al.
CGA, Common Ground Alliance, Best Practices, Version 3.0, Mar. 2006, 100 pages.
CGA, Common Ground Alliance, Best Practices, Version 5.0, Mar. 2008, http://web.archive.org/web/20101009040317/http://www.commongroundalliance.com/Content/NavigationMenu/Best_Practices/Best_Practices_2008/BP_5.0_March2008_Fial.pdf.
Charlton, B.G. et al., "Auditing as a tool of public policy—The misuse of quality assurance techniques in the UK university expansion," Final draft of a paper published in European Political Science 2002; 2: 24-35.
GPS Visualizer: Free geocoder: Convert address to coordinates, http://web.archive.org/web/20070304090412/http://www.gpsvisualizer.com/geocoding.html, Mar. 2007, 1 page.
Haas, J. et al., "Feed the FLAME—Utility Integrates Field Applications," GeoWorld, Mar. 2007, 5 pages, online: Systems Integration Articles/Enspiria Solutions.
International Search Report and Written Opinion, Application No. PCT/US2009/03810, Aug. 17, 2010.
Office Action dated Apr. 28, 2011 from U.S. Appl. No. 12/204,454.
Office Action dated Sep. 26, 2011 from Canadian Application No. 2,739,090.
Office Action dated Sep. 26, 2011 from Canadian Application No. 2,739,110.
Office Action dated Sep. 27, 2011 from Canadian Application No. 2,739,094.
Office Action dated Oct. 11, 2011 from Canadian Application No. 2,691,780.
Office Action dated Oct. 11, 2011 from U.S. Appl. No. 12/432,849.
Office Action dated Oct. 11, 2011 from U.S. Appl. No. 12/432,878.
Office Action dated Oct. 11, 2011 from U.S. Appl. No. 12/432,909.
Office Action dated Nov. 21, 2011 from U.S. Appl. No. 12/204,454.
Office Action dated Dec. 6, 2011 from U.S. Appl. No. 12/432,870.
Office Action dated Dec. 7, 2011 from U.S. Appl. No. 12/537,856.
Office Action dated Dec. 9, 2011 from U.S. Appl. No. 12/493,109.
Office Action dated Dec. 12, 2011 from U.S. Appl. No. 12/537,917.
Office Action dated Dec. 13, 2011 from U.S. Appl. No. 12/537,894.
Office Action dated Dec. 19, 2011 from U.S. Appl. No. 12/571,356.
Office Action dated Dec. 22, 2011 from U.S. Appl. No. 12/537,732.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Tetra Tech NUS, "Standard Operation Procedures," Dec. 2003 [retrieved on Jul. 27, 2010, http://htl.mclinc.org/%5CWillowGroveNASAdminRecord%5CPdfs%5CFinal21345_appendA.pdf>, 315 pages.
Whiting, P., "No role for quality scores in systematic reviews of diagnostic accuracy studies," BMC Medical Research Methodology, 2005, 5:19, 9 pages.
CGA, Common Ground Alliance, Best Practices, Version 1.0, Apr. 2003.
CGA, Common Ground, Study of One-Call Systems and Damage Prevention Best Practices, Aug. 1999.
Co-pending U.S. Appl. No. 12/204,454, filed Sep. 4, 2008.
Co-pending U.S. Appl. No. 12/364,339, filed Feb. 2, 2009.
Co-pending U.S. Appl. No. 12/432,849, filed Apr. 20, 2009.
Co-pending U.S. Appl. No. 12/432,860, filed Apr. 30, 2009.
Co-pending U.S. Appl. No. 12/432,870, filed Apr. 30, 2009.
Co-pending U.S. Appl. No. 12/432,878, filed Apr. 30, 2009.
Co-pending U.S. Appl. No. 12/432,909, filed Apr. 30, 2009.
Co-pending U.S. Appl. No. 12/493,109, filed Jun. 26, 2009.
Co-pending U.S. Appl. No. 12/537,732, filed Aug. 7, 2009 filed.
Co-pending U.S. Appl. No. 12/537,856, filed Aug. 7, 2009.
Co-pending U.S. Appl. No. 12/537,894, filed Aug. 7, 2009.
Co-pending U.S. Appl. No. 12/537,917, filed Aug. 7, 2009.
Co-pending U.S. Appl. No. 12/571,356, filed Sep. 30, 2009.
Co-pending U.S. Appl. No. 12/572,260, filed Oct. 1, 2009.
International Search Report and Written Opinion, Application Serial No. PCT/US2009/005444, Feb. 8, 2010.
U.S. Appl. No. 12/571,408, filed Sep. 30, 2009, Nielsen et al.
Notice of Allowance dated Apr. 17, 2012 from U.S. Appl. No. 12/432,870.
Office Action dated Feb. 14, 2012 from U.S. Appl. No. 12/833,103.
Office Action dated Feb. 29, 2012 from U.S. Appl. No. 12/704,485.
Office Action dated Feb. 29, 2012 from U.S. Appl. No. 12/833,117.
Office Action dated Feb. 29, 2012 from U.S. Appl. No. 12/833,127.
Office Action dated Mar. 1, 2012 from U.S. Appl. No. 12/833,121.
Office Action dated Mar. 19, 2012 from U.S. Appl. No. 12/204,454.
Office Action dated May 9, 2012 from U.S. Appl. No. 12/432,909.
Office Action dated May 11, 2012 from Australian Application No. 2009300343.
Office Action dated May 22, 2012 from U.S. Appl. No. 12/432,849.
Office Action dated May 22, 2012 from U.S. Appl. No. 12/572,260.
Office Action dated May 22, 2012 from U.S. Appl. No. 12/432,878.
Office Action dated Jun. 14, 2012 from U.S. Appl. No. 12/432,860.
Cardno Tbe, "Locating Underground Utilities Before Construction," Airport Facilities, Fall 2004, http://www.subsurfaceutilityengineering.com/articles/Locating_Utilities.asp, 2 pages.
Office Action dated May 31, 2012 from Australian Application No. 2009300323.
Office Action dated Jun. 1, 2012 from Australian Application No. 2009300342.
Office Action dated Jul. 9, 2012 from U.S. Appl. No. 12/493,109.
Office Action dated Jul. 12, 2012 from U.S. Appl. No. 12/537,856.
Office Action dated Jul. 16, 2012 from Canadian Application No. 2,691,780.
Office Action dated Sep. 25, 2012 from Australian Application No. 2010214066.
Office Action dated Oct. 15, 2012 from U.S. Appl. No. 12/850,712.
Alstete, J.W., Benchmarking in Higher Education: Adapting Best Practices to Improve Quality, ASHE-ERIC Higher Education Report No. 5, 1995.
Office Action dated Jun. 29, 2013 from U.S. Appl. No. 12/704,485.
Office Action dated Feb. 1, 2013 from U.S. Appl. No. 12/850,187.
Office Action dated Feb. 4, 2013 from Canadian Application No. 2,729,590.
Office Action dated Feb. 6, 2013 from U.S. Appl. No. 12/833,121.
Office Action dated Feb. 12, 2013 from U.S. Appl. No. 12/833,103.
Office Action dated Feb. 12, 2013 from U.S. Appl. No. 12/833,117.
Office Action dated Feb. 12, 2013 from U.S. Appl. No. 12/833,127.
Office Action dated Apr. 24, 2013 from U.S. Appl. No. 12/432,909.
Office Action dated Apr. 29, 2013 from U.S. Appl. No. 12/432,849.
Office Action dated Apr. 18, 2013 from U.S. Appl. No. 12/571,356.
Nielsen et al., co-pending U.S. Publication No. 2013-0006718, published Jan. 3, 2013.
Office Action dated Mar. 27, 2013 from U.S. Appl. No. 12/850,712.
Office Action dated Aug. 21, 2013 from Canadian Application No. 2,739,110.
Office Action dated Aug. 29, 2013 from U.S. Appl. No. 13/465,524.
Notice of Allowance dated Aug. 21, 2013 from U.S. Appl. No. 12/850,187.
U.S. Appl. No. 13/943,350, filed Jul. 16, 2013, Nielsen et al.
Bauer, S. et al., "Quantification of groundwater contamination in an urban area using integral pumping tests," Journal of Contaminant Hydrology; vol. 75, Issues 3-4; Dec. 2004, pp. 183-213.

(56) References Cited

OTHER PUBLICATIONS

Holder, T. et al., A new approach for source zone characterization: the Neckar Valley study. Groundwater Quality: Remediation and Protection, IAHS Publication, vol. 250, IAHS Press, Wallingford, Oxfordshire, UK, pp. 49-55.
Maqsood, I et al., Simulation-based risk assessment of contaminated sites under remediation scenarios, planning periods, and land-use patterns-a Canadian case study, Stoch Environ Res Risk Assess 2005, 19:146-157.
Mike Herbert, Karel Kovar, Universitat Tubingen Geological Institute "Groundwater Quality: Remediation and Projection" IAHS Publication No. 250, Proceedings of the GQ conference held in Tubingen, German from to Sep. 21-25, 1998.
Office Action dated Jun. 20, 2013 from U.S. Appl. No. 12/833,117.
Notice of Allowance dated Jun. 21, 2013 from U.S. Appl. No. 12/572,260.
Office Action dated Jun. 3, 2013 from Canadian Application No. 2,691,780.
Office Action dated Jun. 19, 2013 from U.S. Appl. No. 12/704,485.
Office Action dated Jun. 20, 2013 from U.S. Appl. No. 12/833,127.
Office Action dated Jun. 25, 2013 from U.S. Appl. No. 12/833,121.
Patent Examination Report No. 2, Australian Application No. 2009300323, May 29, 2013.
Patent Examination Report No. 2, Australian Application No. 2009300342, Jul. 1, 2013.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Nielsen et al., co-pending U.S. Publication No. 2013-0174072, published Jul. 4, 2013.
Notice of Allowance dated Nov. 26, 2013 from U.S. Appl. No. 12/833,103.
Notice of Allowance dated Dec. 16, 2013 from U.S. Appl. No. 12/704,485.
Office Action dated Jan. 15, 2014 from U.S. Appl. No. 12/432,909.
Office Action dated Nov. 19, 2014 from U.S. Appl. No. 12/204,454.
Patent Examination Report dated Sep. 5, 2014 from Australian Application No. 2010358572.
Office Action dated Sep. 2, 2014 from Canadian Application No. 2,729,590.
Office Action dated Sep. 29, 2014 from Canadian Application No. 2,691,780.
U.S. Appl. No. 14/075,011, filed Nov. 8, 2013, Nielsen et al.
Office Action dated Jul. 17, 2014 from U.S. Appl. No. 12/537,894.
Office Action dated Jul. 31, 2014 from U.S. Appl. No. 12/833,121.
Office Action dated Aug. 4, 2014 from U.S. Appl. No. 12/833,127.
Office Action dated Jul. 31, 2014 from U.S. Appl. No. 12/833,117.
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008_Final.pdf[Best Practices 5.0].
Office Action dated Mar. 26, 2014 from U.S. Appl. No. 12/537,917.
Office Action dated Apr. 9, 2014 from U.S. Appl. No. 12/537,732.
Office Action dated May 22, 2014 from U.S. Appl. No. 12/850,712.
Office Action dated May 23, 2014 from U.S. Appl. No. 12/537,894.
Office Action dated Jun. 10, 2014 from U.S. Appl. No. 13/465,524.
Office Action dated Feb. 11, 2014 from Canadian Application No. 2,729,590.
Office Action dated Feb. 11, 2014 from U.S. Appl. No. 12/432,849.
Office Action dated Feb. 20, 2014 from Canadian Application No. 2,691,780.
Turner, R., "Standard Operating Procedures," *Appendix A for Sampling and Analysis Plan for Interim Groundwater Monitoring Site 3—Ninth Street Landfill* (Tetra Tech NUS, 2008), retrieved online at: Horsham Township Library: Willow Grove Naval Air Station Administrative Record Index <http://htl.mclinc.org/%5CWillowGroveNASAdminRecord%5CPdfs%5CFnial21345_appendA.pdf.

Office Action dated Mar. 26, 2014 from U.S. Appl. No. 12/204,454.
Office Action dated Mar. 7, 2014 from U.S. Appl. No. 12/432,878.
Office Action dated Jun. 19, 2013 from U.S. Appl. No. 12/833,103.
Office Action dated Oct. 10, 2013 from U.S. Appl. No. 12/850,712.
Office Action dated Sep. 24, 2013 from Canadian Application No. 2,739,094.
Office Action dated Oct. 16, 2013 from Canadian Application No. 2,691,780.
Nielsen et al., co-pending U.S. Pat. No. 8,612,148, issued Dec. 17, 2013.
Opinion and Order Following Motion for Judgment on Pleadings, Jan. 21, 2015; Case 2:13-cv-00346-MSD-LRLVAED *CertusView Technologies, LLC* v *S&N Locating Services*; (Eastern District of Virginia).
Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit A to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-10 to Memorandum of Law in Support of Defendants' Motion for Exceptional Case Finding and Attorneys' Fees filed Feb.

(56) References Cited

OTHER PUBLICATIONS 4, 2015; Case 2:13-cv-00346-MSD-TEM; *CertusView Technologies, LLC* v. *S&N Locating Services, LLC et al.*, (Eastern District of Virginia).

Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

CertusView's Response in Opposition to S&N's Motion for Exceptional Case Finding and Attorneys' Fees filed Feb. 27, 2015; Case 2:13-cv-00346-MSD-TEM; *CertusView Technologies, LLC* v. *S&N Locating Services, LLC et al.*, (Eastern District of Virginia).

Reply in Support of Defendants' Motion for Exceptional Case Finding and Attorneys' Fees filed Mar. 9, 2015; Case 2:13-cv-00346-MSD-TEM; *CertusView Technologies, LLC* v. *S&N Locating Services, LLC et al.*, (Eastern District of Virginia).

Memorandum Order regarding Functional Equivalency Objections and Sanctions Objections filed Mar. 11, 2015; Case 2:13-cv-00346-MSD-TEM; *CertusView Technologies, LLC* v. *S&N Locating Services, LLC et al.*, (Eastern District of Virginia).

Office Action dated Mar. 25, 2015 from U.S. Appl. No. 14/063,417.

S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC* v. *S&N Locating Services, LLC et al.*, (Eastern District of Virginia).

CertusView's Objections to the Magistrate Judge's Order Allowing S&N's Amended Answer and Counterclaims filed Feb. 2, 2015; Case No. 2:13-cv-346 (MSD) (TEM); *CertusView Technologies, LLC* v. *S&N Locating Services, LLC et al.*, (Eastern District of Virginia).

Office Action dated Apr. 8, 2015 from U.S. App. No. 12/432,878.

Notice of Allowance dated Apr. 8, 2015 from U.S. Appl. No. 14/665,518.

Office Action dated Apr. 8, 2015 from U.S. Appl. No. 12/204,454.

First Action Interview Pre-Interview Communication dated Apr. 23, 2015 from U.S. Appl. No. 14/332,352.

Grant, Anthony M., Workplace, Executive and Life Coaching: An Annotated Bibliography from the Behavioural Science Literature, Coaching Publications from 1937 to Jul. 2008, 87 pages.

Office Action dated Apr. 24, 2015 from Canadian Application No. 2,776,434.

Office Action dated May 7, 2015 from U.S. Appl. No. 12/537,894.

Office Action dated Jun. 5, 2015 from U.S. Appl. No. 12/537,856.

Section 330523-1 Guidelines for Utility Horizontal Directional Borings, published on Oct. 26, 2007 at www.nashville.gov, 9 pages.

S&N Locating Services, LLC's and S&N Communications, Inc.'s Second Amended answer, Affirmative Defenses, and Counterclaims to Plaintiff's First Amended Complaint filed Jun. 12, 2015; Case No. 2:13-cv-346 (MSD) (TEM); *CertusView Technologies, LLC* v. *S&N Locating Services, LLC et al.*, (Eastern District of Virginia).

Notice of Filing of Defendants' Second Amended Answer and Counterclaims filed Jun. 12, 2015; Case No. 2:13-cv-346 (MSD) (TEM); *CertusView Technologies, LLC* v. *S&N Locating Services, LLC et al.*, (Eastern District of Virginia).

Notice of Allowance dated Jul. 10, 2015 from U.S. Appl. No. 12/833,121.

Office Action dated Jul. 7, 2015 from Canadian Application No. 2,739,094.

Patent Examination Report dated Jun. 29, 2015 from Australian Application No. 2014201054.

U.S. Appl. No. 14/579,223, filed Dec. 22, 2014, Nielsen et al.

Notice of Allowance dated Oct. 24, 2014 from U.S. Appl. No. 14/075,011.

Office Action dated Feb. 9, 2015 from Canadian Application No. 2,729,590.

Office Action dated Dec. 18, 2014 from U.S. Appl. No. 12/537,917.

Office Action dated Feb. 11, 2015 from U.S. Appl. No. 12/493,109.

Office Action dated Jan. 12, 2015 from U.S. Appl. No. 12/571,356.

Office Action dated Mar. 20, 2015 from Canadian Application No. 2,739,110.

Office Action dated Mar. 17, 2015 from Canadian Application No. 2,712,126.

Office Action dated Mar. 17, 2015 from Canadian Application No. 2,739,090.

Office Action dated Mar. 20, 2015 from U.S. Appl. No. 12/833,117.

Office Action dated Mar. 19, 2015 from U.S. Appl. No. 12/833,121.

Office Action dated Mar. 19, 2015 from U.S. Appl. No. 12/833,127.

(56) References Cited

OTHER PUBLICATIONS

Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC* v. *S&N Locating Services, LLC et al.*, (Eastern District of Virginia) (Parts 1, 2, 3 and 4).

Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC* v. *S&N Locating Services, LLC et al.*, (Eastern District of Virginia).

CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC* v. *S&N Locating Services, LLC et al.*, (Eastern District of Virginia).

Memorandum Order filed Aug. 7, 2015; Case 2:13-cv-00346-MSD-TEM; *CertusView Technologies, LLC* v. *S&N Locating Services, LLC et al.*, (Eastern District of Virginia).

* cited by examiner

Initial Ticket
600

Excavation Notice

602 — KD   00005 POCS 12/31/08 20:19:11 20083771309-000 NEW  XCAV RTN

============================ UNDERGROUND UTILITY LINE PROTECTION REQUEST============================

604A — Serial Number--[20083771309]-[000] Channel#--[2013026][0313]

Message Type--[NEW][EXCAVATION][ROUTINE]

County--[BUCKS]          Municipality--[BENSALEM TWP]
Work Site--[100 ST. FRANCIS LN]
      Nearest Intersection--[SMOKY MOUNTAIN HWY]
      Second Intersection--[CHESTNUT HILL]
      Subdivision--[]                Site Marked in White--[N]

604B — Location Information--
      [MARK PERIMETER OF BUILDING]
      Caller Lat/Lon--[]
Mapped Type--[P]  Mapped Lat/Lon--

606 — [35.67696022/-83.7560695]
      Map Graphic--[http://www.palcall.org/ViewMap/view.aspx?sn=20083771309]

Type of Work--[INSTL CONDUIT]                      Depth--[18-30IN]
Extent of Excavation--[392FT]        Method of Excavation--[DRILL, TRENCHER]
Street--[ ] Sidewalk--[ ] Pub Prop--[ ] Pvt Prop--[X] Other--[]

608 —    Lawful Start Dates--[06-Jan-09] Through [15-Jan-09]
      Scheduled Excavation Date--[06-Jan-09]  Dig Time--[0700] Duration--[3 DAYS]
                     Response Due Date--[05-Jan-09]

Caller--[ANDREW JONES]               Phone--[732-690-8274] Ext--[]
610 — Excavator--[JACK SMITH CONSTRUCTION]       Homeowner/Business--[B]
Address--[17 WILLOW RD]
City--[PALMER]                  State--[PA] Zip--[18045]
FAX--[610-258-9238]  Email--[JACKSMITHLLC@YAHOO.COM]
Work Being Done For--[VERIZON FTTP AND INFRASOURCE]

Person to Contact--[ANDREW JONES]         Phone--[732-690-8274] Ext--[]
612 — Best Time to Call--[ANYTIME ]

Prepared--[31-Dec-08] at [2019] by [JANE DOE]

616 — Job Number--[8A37020-002]

614 — Remarks--
      []

FP 0   FP =W&SA         HR 0  HR =AQUA TN INC    HR10
KD 0   KD =TWNSND WRTR  XZ 0  XZ =COMCAST CABLE B  YI 0  YI =VERIZON HRSM

Serial Number--[20083771309]-[000]

FIG. 6

| | |
|---|---|
| Timestamp (2005-10-20 09:43) — 1010 | Facility Type Identifier (Power) — 1020 |
| Facility Mark Location (N38° 51.40748, W077°20.27798;...; N38° 51 1.40784, W077°20.27865) — 1030 | |
| Environmental Landmark Identifier (Curb) — 1040 | |
| Environmental Landmark Location (N38° 51.40756, W077°20.27805;...; N38° 51 1.40733, W077°20.27858) — 1050 | |
| Other Information (1.2 Meters Between Curb and Power Line) — 1060 | |
| Facility Owner/Operator (ABC Corp) — 1065 | Marking Method (Red Paint) — 1070 |
| Property Address (555 Main Street, 22220) — 1080 | Ticket Number (1234567) — 1090 |
| Location Stamp (N38° 51.40752, W077°20.27840) — 1015 | Certification (Joe Locator) — 1025 |

Entry/Message — 1000

FIG. 10

METHODS AND APPARATUS FOR ANALYZING LOCATE AND MARKING OPERATIONS WITH RESPECT TO HISTORICAL INFORMATION

CROSS-REFERENCES TO RELATED APPLICATIONS

This application claims a priority benefit, under 35 U.S.C. §119(e), of U.S. Provisional Patent Application Ser. No. 61/102,186, filed on Oct. 2, 2008, entitled "Data Acquisition System For And Method Of Analyzing Locate Operations With Respect To Historical Tickets."

This application also claims a priority benefit, under 35 U.S.C. §120, as a continuation-in-part (CIP) of U.S. Non-provisional patent application Ser. No. 12/493,109, filed Jun. 26, 2009, entitled "Methods and Apparatus for Quality Assessment of a Field Service Operation."

This application also claims a priority benefit, under 35 U.S.C. §120, as a continuation-in-part (CIP) of U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same," which in turn claims the benefit, under 35 U.S.C. §119(e), of U.S. Provisional Application Ser. No. 61/102,122, filed on Oct. 2, 2008, entitled "Combination Locate and Marking Device With a Data Acquisition System Installed Therein, and Associated Methods."

Ser. No. 12/569,192 also claims a priority benefit, under 35 U.S.C. §120, as a continuation-in-part (CT) of U.S. Non-provisional application Ser. No. 12/568,087, filed on Sep. 28, 2009, entitled "Methods and Apparatus for Generating an Electronic Record of Environmental Landmarks Based on Marking Device Actuations," which in turn claims the benefit, under 35 U.S.C. §119(e), of U.S. Provisional Patent Application Ser. No. 61/102,205, filed Oct. 2, 2008, and entitled "Data Acquisition For And Method Of Analyzing Locate Operations With Respect To Environmental Landmarks."

Ser. No. 12/568,087 also claims a priority benefit, under 35 U.S.C. §120, as a continuation-in-part (CIP) of U.S. Non-provisional application Ser. No. 12/539,497, filed on Aug. 11, 2009, entitled "Methods and Apparatus for Generating an Electronic Record of a Marking Operation based on Marking Device Actuations," which in turn claims the benefit, under 35 U.S.C. §119(e), of U.S. Provisional Application Ser. No. 61/102,151, filed on Oct. 2, 2008, entitled "Data acquisition system for and method of analyzing marking operations based on marking device actuations."

Each of the above-identified applications is incorporated by reference herein in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as a "locate"). In a typical locate and marking operation, a locate technician visits a work site at which there is a plan to disturb the ground (e.g., excavating, digging one or more holes and/or trenches, boring, etc.) to determine a presence or an absence of one or more underground facilities (such as various types of utility cables and pipes) in a dig area to be excavated or otherwise disturbed at the work site. In some instances, a locate and marking operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate and marking operation is initiated as a result of an excavator 110 providing an excavation notice to a one-call center 120. An excavation notice also is commonly referred to as a "locate request," and may be provided by the excavator to the one-call center via an electronic mail message, an information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection "polygon maps" which indicate, within a given geographic area over which the one-call center has jurisdiction, generally where underground facilities may be found relative to some geographic reference frame or coordinate system.

Polygon maps typically are provided to the one-call centers by underground facility owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps." Facilities maps typically are maintained by facilities owners/members within the jurisdiction and show, for respective different utility types, where underground facilities purportedly may be found relative to some geographic reference frame or coordinate system (e.g., a grid, a street or property map, latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner 140 may contract with a locate service provider 130 to receive locate request tickets and perform locate and marking operations on behalf of the facility owner 140. In response to a received locate request ticket, the locate service provider may dispatching a locate technician 150 to verify a presence or absence of the underground facilities in the prescribed dig area.

Upon receiving the locate ticket, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. The transmitter is connected via a connection point to a target object (in this example, underground facility) located in the ground, and generates the applied signal coupled to the underground facility via the connection point (e.g., to a tracer wire along the facility), resulting in the generation of a magnetic field. The magnetic field in turn is detected by the locate receiver, which itself may include one or more detection antenna. The locate receiver indicates a presence of a facility when it detects electromagnetic fields arising from the applied signal. Conversely, the absence of a signal detected by the locate receiver of generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or another surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

As discussed above, in various field service operations, a number of field technicians typically are dispatched to perform field operations at any given time, and over any given time period each technician may be assigned numerous work orders, or "tickets" specifying aspects of the field operations to be performed. The volume of tickets per technician may be particularly high in the construction industry, especially in connection with locate and marking operations. The inventors have recognized and appreciated that implementing and performing meaningful oversight and quality control activities in a timely fashion for several field technicians each performing several field operations in a given time period may present challenges, and that failure to perform meaningful oversight and quality control activities may adversely affect customer satisfaction.

Additionally, the inventors have appreciated that the time, effort, and cost that is associated with re-performing work in the field, or with correcting and/or improving poorly performed field calls, may be unacceptable. Consequently, the inventors have realized that a need exists for methods of providing oversight and quality control in field service operations in order to improve customer satisfaction, to identify and reduce the number of poorly performed tickets, and to improve visibility into distributed workforce operations.

In view of the foregoing, various inventive embodiments disclosed herein relate generally to methods, apparatus and systems for computer-aided determination of quality assessment for locate and/or marking operations. In some embodiments, a quality assessment decision is solely under the discretion of a human reviewer, albeit facilitated in some respects by computer-aided display of information, and electronic record-keeping and communication functions associated with the quality assessment result(s). In other embodiments, information related to a locate and/or marking operation is electronically analyzed such that a quality assessment is not based solely on human discretion, but rather based at least in part on some predetermined criteria and/or metrics that facilitate an automated determination of quality assessment.

More specifically, in some embodiments, methods, apparatus and systems according to the present disclosure relate to at least partially automating oversight and quality assessment in underground facility locate applications and/or other field service operations. For example, in some embodiments, an automated quality assessment system may receive information related to a locate and/or marking operation from one or more sources of electronic data (also referred to herein as "field information" or "field data"), analyze the contents of the received electronic data, and automatically assess the quality of the operation based at least in part on the analysis. In other embodiments, automated analysis of at least some of the received electronic data relating to the locate and/or marking operation facilitates further analysis and/or quality assessment by a human, in which the quality assessment is not based solely on the discretion of the human, but is significantly informed in some manner by automated analysis of data.

In some exemplary implementations in which a quality of a locate and/or marking operation is assessed via an at least partially automated process, some or all of the available field information (e.g., which in some instances is derived from data contained in an electronic record of the locate and/or marking operation) is compared to "reference information" or "reference data" (which in some instances is derived from information/data contained in a "reference" electronic record). Examples of types of reference information/data used in a quality assessment process according to various embodiments discussed herein may include, but are not limited to: 1) information/data derived from or relating to one or more facilities maps that illustrate the presumed locations of underground facilities purportedly present in a geographic area proximate to or surrounding and subsuming the work site; 2) information/data derived from or relating to one or more previous locate and/or marking operations at or near the work site (referred to herein as "historical tickets" or "historical data"); and/or 3) information/data relating to one or more environmental landmarks present in a geographic area proximate to or surrounding and subsuming the dig area (e.g., the work site and its environs), or within the dig area itself (referred to herein as "landmark information," which may be available, for example, from facilities maps, historical tickets, and/or field data collected at or around the time of the locate and/or marking operation being assessed).

In other aspects, the quality assessment of the locate and/or marking operation may be performed, in whole or in part, by one or more analysis components (e.g., one or more processors executing instructions) separate and/or remote from the locate and/or marking device used in connection with the locate and/or marking operation. Alternatively, the assessment may be performed, in whole or in part, by one or more analysis components incorporated within or otherwise coupled to a locate device, a marking device, and/or a combined locate and marking device. Depending on the nature of the assessment, it may be performed substantially in real time with respect to the generation of the field information/data used in connection with the assessment (e.g., one or more electronic records of a locate and/or marking operation and/or an electronic manifest of same), otherwise during a locate and/or marking operation, or after completion of a locate and/or marking operation.

In some embodiments described herein, a notification may be generated based on the quality assessment performed. The notification may provide one or more indications of the quality of the locate and/or marking operation as a whole, or of some aspect thereof. For example, the notification may provide an indication of a degree of correspondence or discrepancy between field data contained in the electronic record of the locate and/or marking operation and reference data contained in the reference electronic record to which it is compared. Likewise, the notification may provide an indication that the locate and/or marking operation is or is not approved based on the comparison of the field data to the reference data. The notification may be transmitted electronically or otherwise conveyed, for example, to one or more parties associated with one or more underground facilities within the dig area or in a geographic area proximate to or surrounding and subsuming the work site, one or more parties associated with the performance or oversight of the locate and/or marking operation, and/or one or more parties associated with excavation of the dig area for example.

As discussed above, some or all of the contents of an electronic record of a current locate and/or marking operation may be compared to some or all of the contents of a reference electronic record. For example, in some illustrative embodiments, the reference electronic record may comprise data derived from or relating to one or more previous (or "historical") locate and/or marking operations conducted at the same work site as the current locate and/or marking operation. The types of data being compared between the current electronic record and the reference electronic record may include geographic information, facility type information, and/or other information relating to the facilities identified and/or marked during the current and historical locate and/or marking operations. For example, the comparison may generally involve determining whether there is agreement between the current locate and/or marking operation and the historical locate and/or marking operation, which may in turn involve identifying at least one correspondence or discrepancy between the compared data, and in some instances a degree of correspondence.

In yet other embodiments, a first electronic representation of field information relating to a locate and/or marking operation (e.g., data in an electronic record, an electronic manifest, etc.), as well as a second electronic representation of reference information (e.g., data in a reference electronic record from any of a variety of sources) to which the first electronic representation is compared, may be visually rendered (e.g., via a computer-generated visual representation in a display field) such that the electronic representations are overlaid to provide a visual aid to an automated assessment process.

In sum, some embodiments of the present disclosure are directed to an apparatus for assessing a quality of a first locate and/or marking operation to identify a presence or an absence of at least one underground facility at a work site. The apparatus comprises: a memory storing processor-executable instructions; at least one I/O interface; and a processor coupled to the memory and the at least one I/O interface. Upon execution of the processor-executable instructions, the processor: A) compares first information relating to the first locate and/or marking operation to second information relating to at least one second locate and/or marking operation different from the first locate and/or marking operation; B) automatically generates, based on A), at least one indication of a quality assessment of the first locate and/or marking operation; and C) electronically stores in the memory, and/or electronically transmits via the at least one I/O interface, the at least one indication of the quality assessment so as to provide an electronic record of the quality assessment.

In some further embodiments, the first locate and/or marking operation is performed by at least one technician, and, in C), the processor transmits at least one feedback message to the at least one technician prior to completion of the first location and/or marking operation, the feedback message being generated based at least in part on the at least one indication of the quality assessment generated in B).

In some further embodiments, the first information is generated by locating equipment used to perform the first locate and/or marking operation, wherein the locating equipment comprises at least one of a marking device, a locate device, and a combined locate and marking device, and wherein prior to A), the processor: receives the first information from the locating equipment, wherein the first information includes locate information, marking information, and/or landmark information.

In some further embodiments, A), B), and C) are performed during or immediately following the locate and/or marking operation, and the processor: D) alters at least one operating characteristic of the locating equipment based on the at least one indication of the quality assessment.

In some further embodiments, the processor: A1) selects for comparison, prior to A), at least some of the first information and/or at least some of the second information based at least in part on a dig area indicator that indicates a dig area of the work site on a digital image.

In some further embodiments, the processor, prior to A): obtains the first information from one or more first electronic records relating to the first locate and/or marking operation, based at least in part on a target of comparison corresponding to one or more aspects of the quality the first locate and/or marking operation; and obtains the second information from one or more second electronic records relating to the at least one second locate and/or marking operation, based at least in part on the target of comparison corresponding to one or more aspects of the quality the first locate and/or marking operation.

In some further embodiments, the at least one second locate and/or marking operation includes a plurality of second locate and/or marking operations; the one or more second electronic records comprise a plurality of second electronic records each corresponding to a different one of the plurality of second locate and/or marking operations; and prior to A), the processor obtains the second information by: obtaining at least one piece of information relevant to the target of comparison from each of the plurality of second electronic records so as to collect a plurality of pieces of information; and aggregate the plurality of pieces of information obtained from the plurality of second electronic records to obtain the second information.

In some further embodiments, the target of comparison comprises first geographic information relating to at least one location at which at least one facility line of the at least one underground facility was detected and/or marked during the locate and/or marking operation; the first information includes a first set of geo-location data points indicating first geographic locations at which the at least one facility line of the at least one underground facility was detected and/or marked during the first locate and/or marking operation; and the second information includes a second set of geo-location data points indicating second geographic locations at which at least one corresponding facility line of the at least one underground facility was detected and/or marked during the at least one second locate and/or marking operation, wherein in A) the processor: A1) compares the first set of geo-location data points with the second set of geo-location data points; and A2) determines a distance between each point in the first set and a nearest point in the second set to generate a vector of distances.

In some further embodiments, the processor in A): provides at least one quality assessment criterion relating to the second information relating to at least one second locate and/or marking operation; provides at least two scoring categories for the at least one quality assessment criterion, each scoring category associated with a scoring value or grade; for each scoring category provides an expected data value or range of expected data values; determines, for the at least one quality assessment criterion, into which of the at least two scoring categories the first locate and/or marking operation falls by comparing the first information to the expected data value or range of expected data values for at least one of the at least two scoring categories; and assigns to the first locate and/or marking operation the scoring value or grade associated with the scoring category into which the locate and marking operation falls.

Some further embodiments of the present disclosure are directed to an apparatus for automatically assessing a quality of a current locate and/or marking operation based at least in part on reference information relating to one or more historical locate and/or marking operations performed at or near a work site of the current locate and/or marking operation. The apparatus comprises: a memory storing processor-executable instructions; at least one I/O interface; and a processor coupled to the memory and the at least one I/O interface. Upon execution of the processor-executable instructions, the processor: A) identifies at least one first geographic location at which at least one facility line of at least one underground facility was detected and/or marked during the current locate and/or marking operation; B) obtains field geo-location data based on A); C) identifies one or more reference electronic records relating to the one or more historical locate and/or marking operations; D) obtains reference geo-location data based C); E) determines a measure of distances between the field geo-location data and the reference geo-location data; F) assesses the quality of the first locate and/or marking operation based at least in part on E); and G) generates at least one indication of a quality assessment based on F).

Some further embodiments of the present disclosure are directed to a method for execution by a computer for assessing a quality of a first locate and/or marking operation to identify a presence or an absence of at least one underground facility at a work site. The computer comprises a memory, at least one I/O interface and a processor. The method comprises: A) comparing first information relating to the first locate and/or marking operation to second information relating to at least one second locate and/or marking operation different from the first locate and/or marking operation; B) automatically generating, based on A), at least one indication of a quality assessment of the first locate and/or marking operation; and C) electronically storing in the memory, and/or electronically transmitting via the at least one I/O interface, the at least one indication of the quality assessment so as to provide an electronic record of the quality assessment.

Some further embodiments of the present disclosure are directed to at least one computer-readable medium encoded with computer-executable instructions which, when executed by at least one processor, perform a method for assessing a quality of a first locate and/or marking operation to identify a presence or an absence of at least one underground facility at a work site. The method comprises: A) comparing first information relating to the first locate and/or marking operation to second information relating to at least one second locate and/or marking operation different from the first locate and/or marking operation; B) automatically generating, based on A), at least one indication of a quality assessment of the first locate and/or marking operation; and C) electronically storing in the memory, and/or electronically transmitting via the at least one I/O interface, the at least one indication of the quality assessment so as to provide an electronic record of the quality assessment.

For purposes of the present disclosure, the term "dig area" refers to a specified area of a work site within in which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device, used alone or in combination with any other device, for detecting and/or inferring the presence or absence of any facility, including without limitation, any underground facility. In various examples, a locate device often includes both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli for causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate and marking operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate and/or marking operation. A locate and/or marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and/or marking operation. The term "locate request ticket" (or simply "ticket") refers to any communication or instruction to perform a locate and/or marking operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "complex event processing (CEP)" refers to a software and/or hardware-implemented (e.g., facilitated by a computer system, distributed computer system, computational analysis coded in software, and/or a combination thereof) technique relating to recognizing one or more events, patterns of events, or the absence of an event or pattern of events, within one or more input streams of information and performing one or more actions and/or computations in response to such recognition, in accordance with specified rules, criteria, algorithms, or logic. CEP generally involves detection of relationships between information contained in input streams (which input streams may include indications of previously recognized events), such as causality, membership, timing, event-driven processes, detection of complex patterns of one or more events, event streams processing, event correlation and abstraction, and/or event hierarchies. CEP may complement and contribute to technologies such as, but not limited to, service oriented architecture (SOA), event driven architecture (EDA), and/or business process management (BPM). CEP allows the information contained in the events flowing through all of the layers of a service business, an enterprise information technology infrastructure and/or a management operation to be discovered, analyzed, and understood in terms of its impact on management goals and business processes, and to be acted upon in real time or as part of a management process.

The following U.S. published application are hereby incorporated herein by reference:

U.S. publication no. 2008-0228294-A1, published Sep. 18, 2008, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0202112-A1, published Aug. 13, 2009, filed Feb. 11, 2009, and entitled "Searchable Electronic Records of Underground Facility Locate Marking Operations;" and U.S. publication no. 2009-0204614-A1, published Aug. 13, 2009, filed Feb. 11, 2009, and entitled "Searchable Electronic Records of Underground Facility Locate Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the present disclosure.

FIG. 6 illustrates an exemplary locate request ticket generated by a one-call center in response to receiving an excavation notice;

FIG. 10 illustrates a data set that may be used to generate an electronic manifest of a locate and/or marking operation, in accordance with some embodiments of the present disclosure;

DETAILED DESCRIPTION

Figure 1:
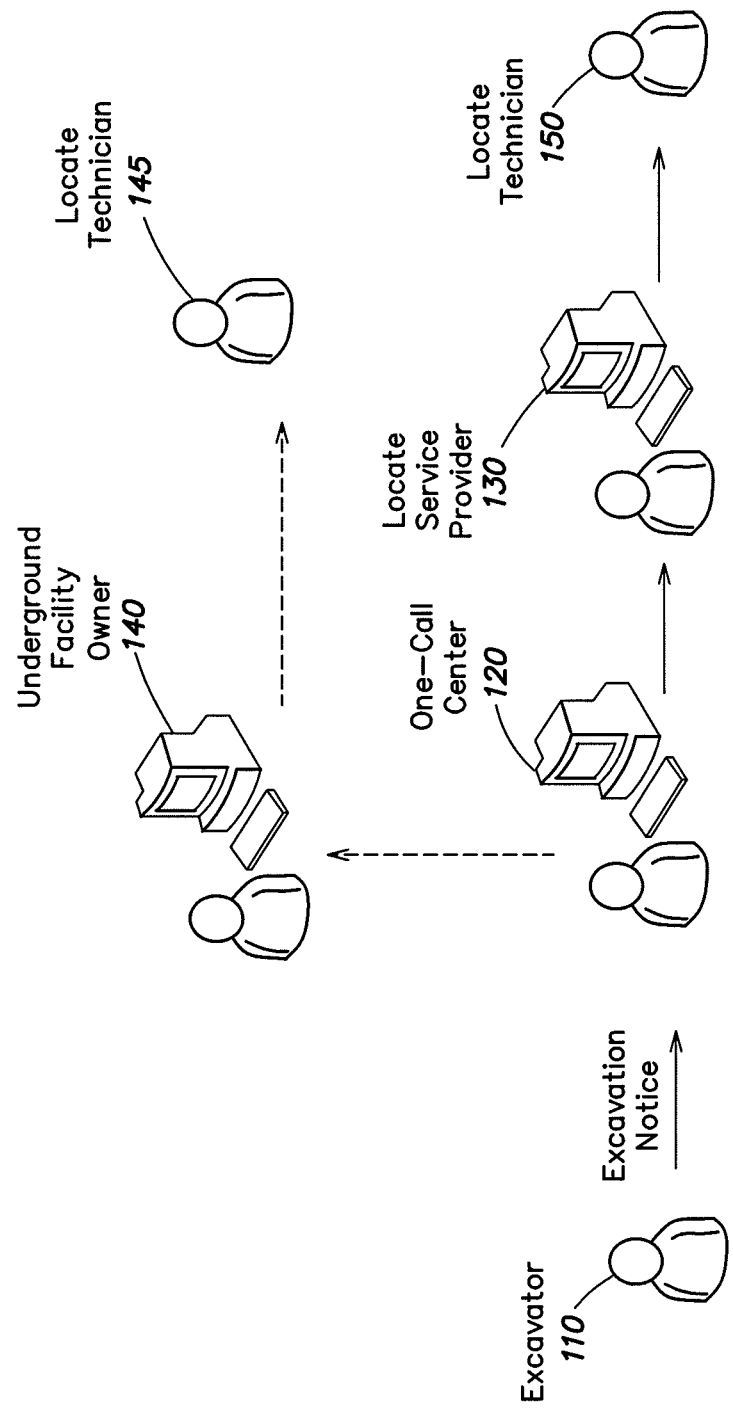
FIG. 1 illustrates an example in which a locate and/or marking operation is initiated as a result of an excavator providing an excavation notice to a one-call center.

Following below are more detailed descriptions of various concepts related to, and embodiments of, inventive systems, methods and apparatus for analyzing locate and/or marking operations with respect to historical information. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. Quality Assessment of Field Service Operations

Various inventive concepts disclosed herein may be employed in the general context of performing oversight and quality control in field service operations, such as locate and/or marking operations. For example, human approvers and/or managers may review a record of a locate and/or marking operation performed by a locate technician, and may assess the quality of the operation in real time and/or within a certain amount of time (e.g., one day) of completion of the operation. This type of review and quality assessment, namely, by one or more humans and based solely on the discretion of the humans, is referred to herein as "manual quality assessment."

Some inventive embodiments described herein may be employed in connection with methods, apparatus and systems for at least partially automating oversight and quality assessment in underground facility locate and/or marking operations and/or other field service operations. For example, in some embodiments, an automated quality assessment system may receive "field information" (also referred to as "field data") related to a locate and/or marking operation from one or more sources of electronic data, such as electronic records of locate and/or marking operations generated by various locate equipment, an electronic manifest for same, ticket information, service-related information, etc. The system may electronically analyze the contents of the field information/data by comparing it to "reference information" (also referred to as reference data) derived from or relating to one or more historical records of locate and/or marking operations, and automatically assess the quality of the operation based at least in part on the analysis (e.g., according to some criteria on which the comparison is based and some appropriate metrics for the criteria).

In some further embodiments, automated analysis of field information/data facilitates additional analysis and/or quality assessment by a human. The quality assessment may not be based solely on the discretion of the human, but may be significantly informed in some manner by the automated analysis of the received electronic data. As contrasted with the above-discussed "manual quality assessment" of a locate and/or marking operation, this type of assessment (e.g., based, to some extent, on an electronic analysis of data relating to the locate and/or marking operation) is referred to herein as "automated quality assessment."

In some embodiments, methods, apparatus and systems according to the present disclosure may automatically compare electronic data relating to a locate and/or marking operation against reference information derived from or relating to one or more historical records. The outcomes or results of the comparisons may be used in deriving one or more of a variety of indications of assessed quality of a locate and/or marking operation. In one aspect, the indication of assessed quality of a locate and/or marking operation may be categorized into one or more of a plurality of quality categories. Any suitable number and type of categories may be used, as the present disclosure is not limited in this respect. For example, in some embodiments, a locate and/or marking operation may be automatically categorized as one of the following: (a) approved—no further action needed; (b) satisfactory, but the locate technician needs coaching or training; (c) unsatisfactory—the ticket needs quality control (QC) action; or (d) real-time prompt—an aspect of the assessment may be suitable for prompting the locate technician in real time with respect to, for example, performing an immediate verification and/or corrective action. Additionally, or alternatively, a score, grade, or other graduated indication (e.g., based on some suitable range or scale) may be provided as an indication of assessed quality of the locate and/or marking operation.

Figure 2:
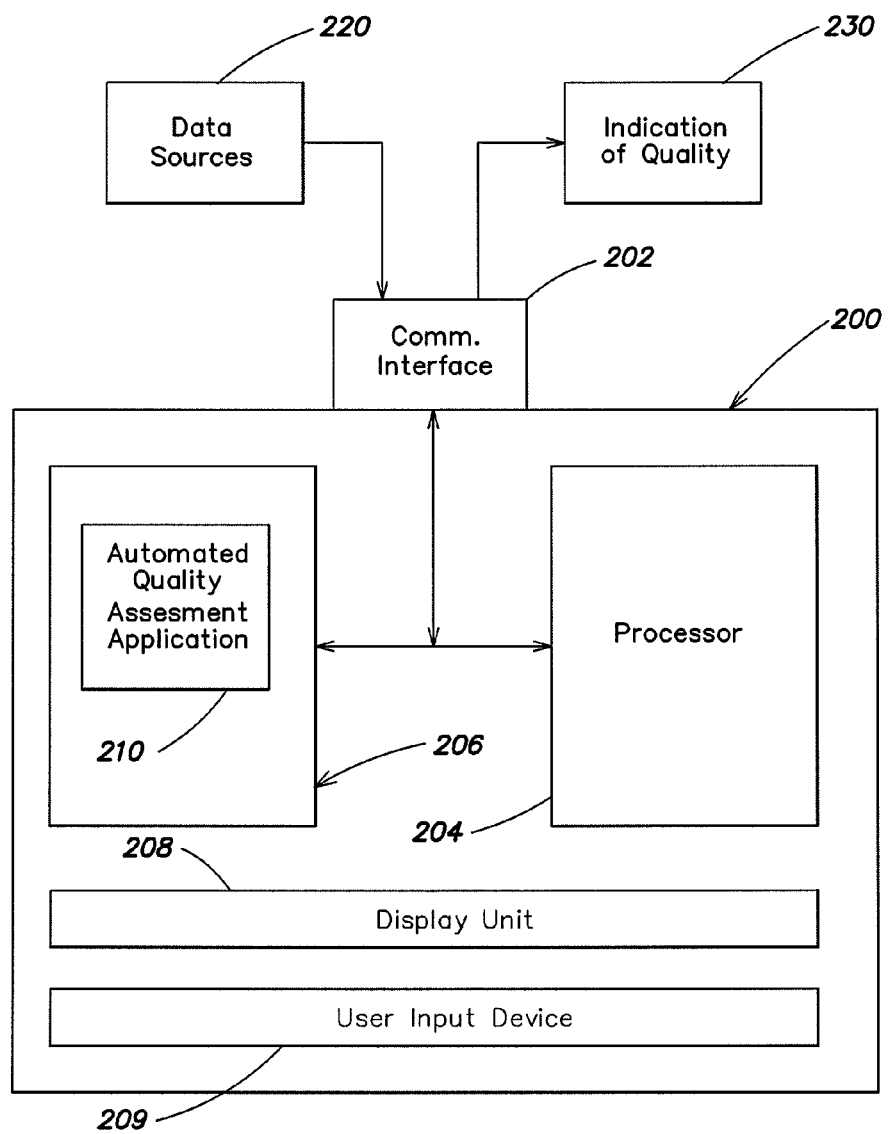
FIG. 2 illustrates an automated quality assessment system for assessing the quality of a field service operation, in accordance with some embodiments of the present disclosure.

FIG. 2 shows an example of an automated quality assessment system 200 in accordance with some embodiments. The automated quality assessment system 200 may, for example, be a computer system having at least one processing units 204 (also referred to herein simply as "processors"), a memory 206 that comprises at least one tangible storage medium (e.g., RAM, ROM, Flash memory, one or more magnetic storage devices, one or more optical storage devices, or any other type of tangible storage medium), and at least one communications interface 202. The memory 206 may store computer-readable instructions of an automated quality assessment application 210, which may be executed by the processor 204. The communication interface 202 may be coupled to a wired or wireless network, bus, or other communication means and may therefore allow the automated quality assessment system 200 to transmit communications to and/or receive communications from other systems.

When executed by the processor 204, the automated quality assessment application 210 may obtain information associated with a field service operation (e.g., a locate and/or marking operation) from data sources 220 via the communication interface 202, analyze the data to assess the quality of the field service operation, and output one or more indications of assessed quality of the field service operation. In some implementations, one or more indications of assessed quality may be stored in the memory 206 and/or transmitted via the communication interface 202 to provide an electronic record of the quality assessment.

It should be appreciated that the automated quality assessment system 200 may be implemented in any suitable manner, as the present disclose is not limited in this respect. For example, part or all of the analysis and/or processing performed by the automated quality system may be implemented using any suitable software and/or hardware techniques, including, but not limited to, complex event processing (CEP) techniques.

In some embodiments, the automated quality assessment system 200 may additionally comprise at least one display unit 208, for example, to allow a user to view various information in connection with execution of the instructions. A user input device 209 may also be provided, for example, to allow the user to make manual adjustments, make selections, enter data or various other information, and/or interact in any of a variety of manners with the automated quality assessment system 200.

Figure 3:
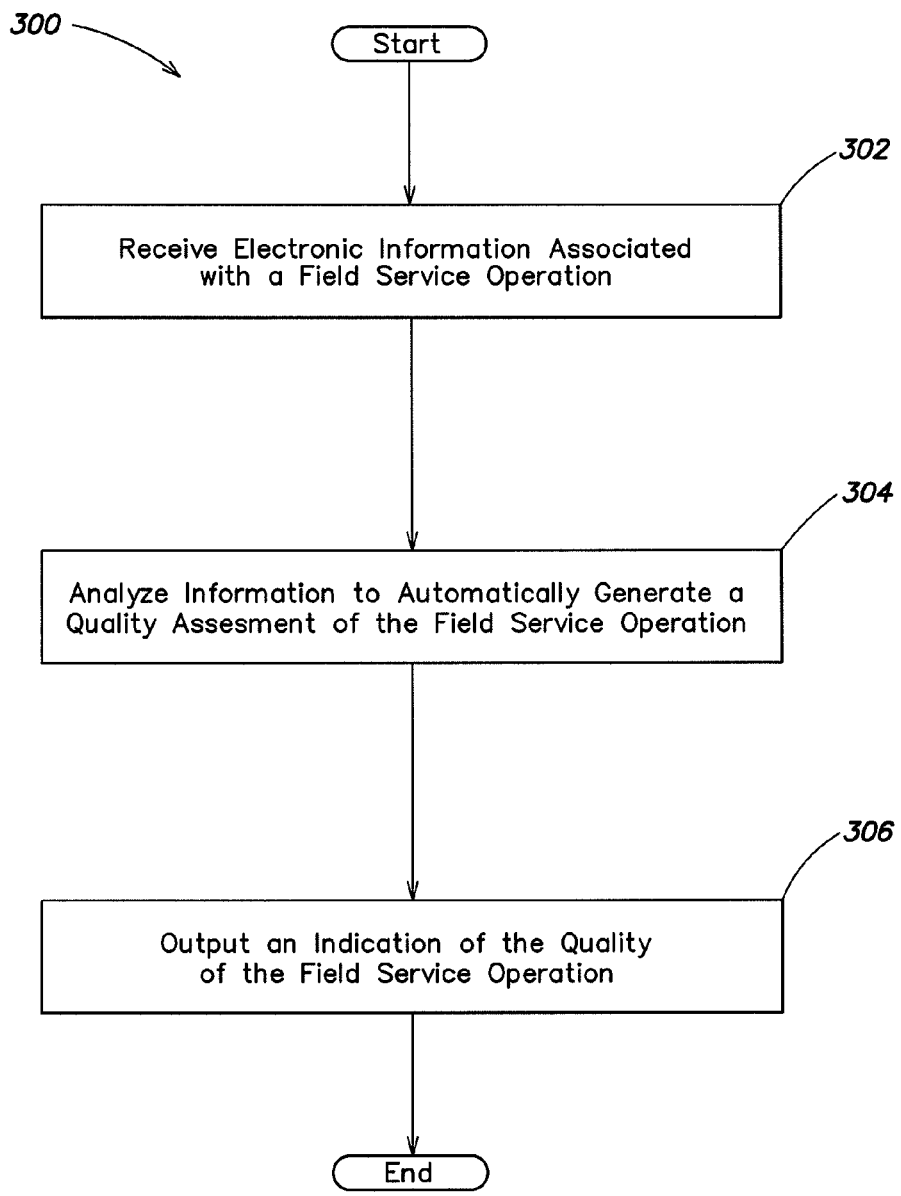
FIG. 3 illustrates a process for automatically assessing the quality of a field service operation, in accordance with some embodiments of the present disclosure.

FIG. 3 shows an example of a process 300 that may be performed by a quality assessment application (e.g., the quality assessment application 210 shown in FIG. 2) to automatically assess the quality of a field service operation, such as, for example, a locate and/or marking operation. The process 300 begins at act 302, where the automated quality assessment application receives electronic information associated with a field service operation. The process 300 next continues to act 304, where the automated quality assessment application analyzes at least some of the received information to automatically generate a quality assessment of the field service operation. The process 300 next continues to act 306, where the automated quality assessment application outputs an indication of the quality of the field service operation based on quality assessment generated in the act 304.

Figure 4:
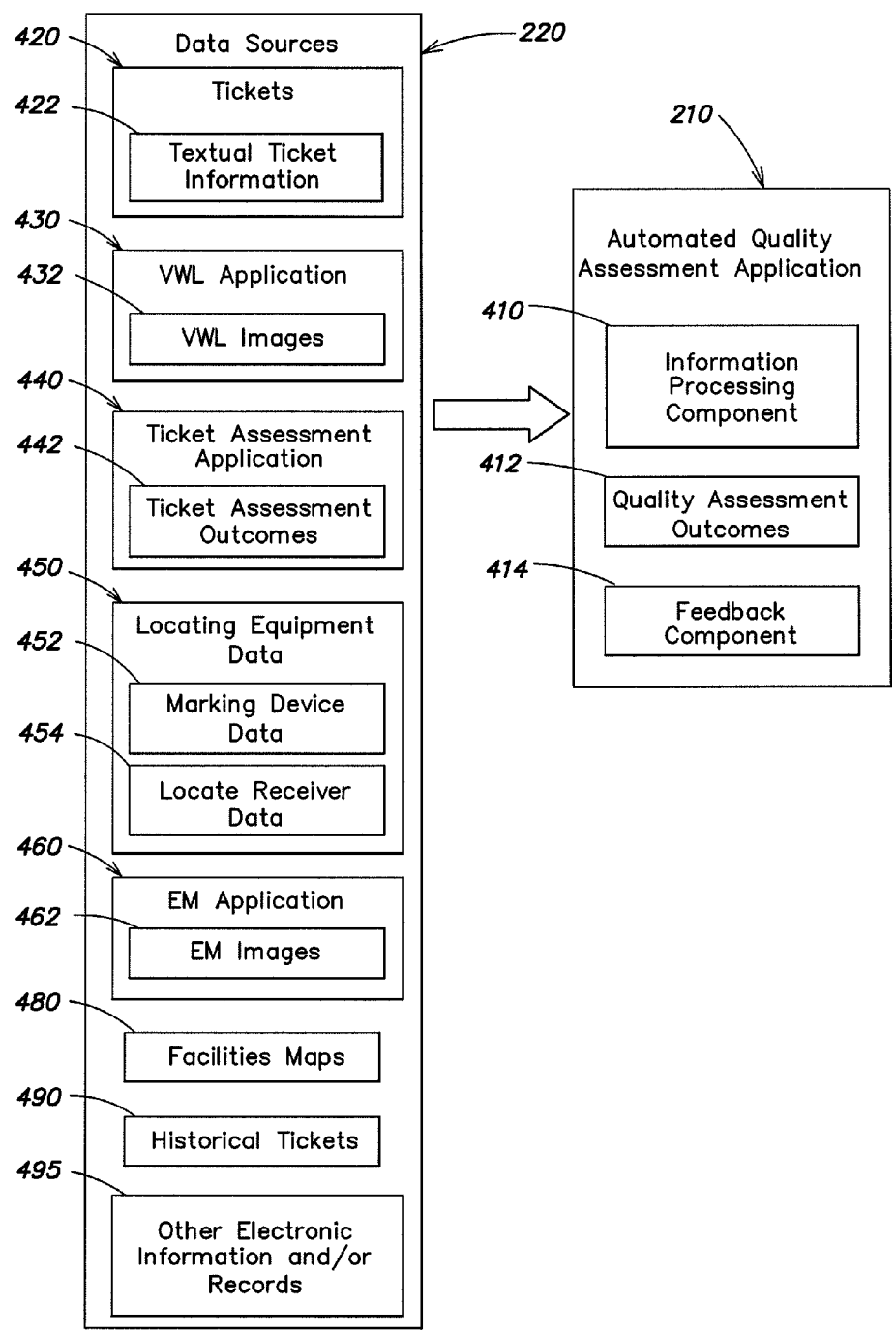
FIG. 4 illustrates a varieties of data sources and an automated quality assessment application for automatically performing quality control in underground facility locate applications, in accordance with some embodiments of the present disclosure.

FIG. 4 presents a more detailed functional block diagram of the automated quality assessment application 210 and the data sources 220, in accordance with some embodiments. For example, the automated quality assessment application 210 may be a rules-based computer software application that includes, for example, an information processing component 410, quality assessment outcomes 412 (e.g., one or more indications of assessed quality) and a feedback component 414. The automated quality assessment application 210 may be fed by any number of data sources (e.g., the data sources 220), which may include various types of electronic information and/or records of data associated with locate and/or marking operations performed in the field (e.g., both "field information/data and "reference information/data").

Examples of the data sources 220 that may be processed by the information processing component 410 of the automated quality assessment application 100 include, but are not limited to, one or more tickets 420 pending review and assessment (which may include textual ticket information 422), virtual white lines (VWL) images 432 managed by a VWL application 130, ticket assessment outcomes 442 generated by a ticket assessment application 440, locating equipment data 450 (which may include locate receiver data 454 and/or marking device data 452), electronic manifest (EM) images 460 generated by an EM application 460, a collection of facilities maps 480, an archive of historical tickets 490, and any other suitable electronic information and/or records 495. In various implementations, the various data sources 220 may be supplied by any number of entities (not shown) and may be accessible to the automated quality assessment application 210 via, for example, a networked computing system for supporting locate and/or marking operations. Further details regarding the data sources 220 are discussed below in connection with FIGS. 6-11.

In various embodiments of automated quality assessment based on information/data derived from the data sources 220, it should be appreciated that some of this information/data may be treated as "field information/data" and some of this information/data may be treated as "reference information/data" to which the field information/data is compared during the assessment process. Additionally, it should be appreciated that some of the information/data available from the data sources 220 may be used to "pre-process" or filter one or both of the field information/data and the reference information/data prior to comparison for some types of assessments.

In some embodiments, the information processing component 410 of the automated quality assessment application 210 may be a rules-based software component that analyzes information contents available in the data sources 220 and automatically assesses the quality of a locate and/or marking operation that is performed in the field. For each locate and/or marking operation that is assessed, the information processing component 410 may automatically generate a quality assessment outcome 412 that corresponds to the results of the automated quality assessment.

Any suitable type of outcome may be generated. For example, in some embodiments, the outcome generated may be a categorization of the locate and/or marking operation into one of a plurality of quality categories (also referred to herein as "scoring" categories or "grading" categories). For example, based on the automatic quality assessment, a locate and/or marking operation may be categorized as:

APPROVED—the locate and/or marking operation is approved, and no further actions are needed;

SATISFACTORY—the locate and/or marking operation is approved, but the locate technician needs coaching or training;

UNSATISFACTORY—the locate and/or marking operation is not approved, and the ticket needs one or more QC actions; or PROMPT—an aspect of the locate and/or marking operation assessment may be suitable for transmitting a real-time prompt to the locate technician with respect to, for example, performing a substantially immediate verification and/or a corrective action.

Other examples of possible outcomes generated by automated ticket application 210 include, but are not limited to, a numerical score (e.g., a score of 0-100%), a grade (e.g., a grade of A-F), or other graduated indicator, based on some appropriate range, scale, resolution and/or granularity that is indicative of the quality of the assessed locate and/or marking operation.

In some embodiments, the feedback component 414 of the automated quality assessment application 210 may be responsible for generating and/or transmitting real-time prompts to on-site locate technicians. For example, once the nature of a real-time prompt is determined, the feedback component 414 may query the corresponding ticket information to ensure that the prompt is directed to an appropriate originating locate technician.

Figure 5:
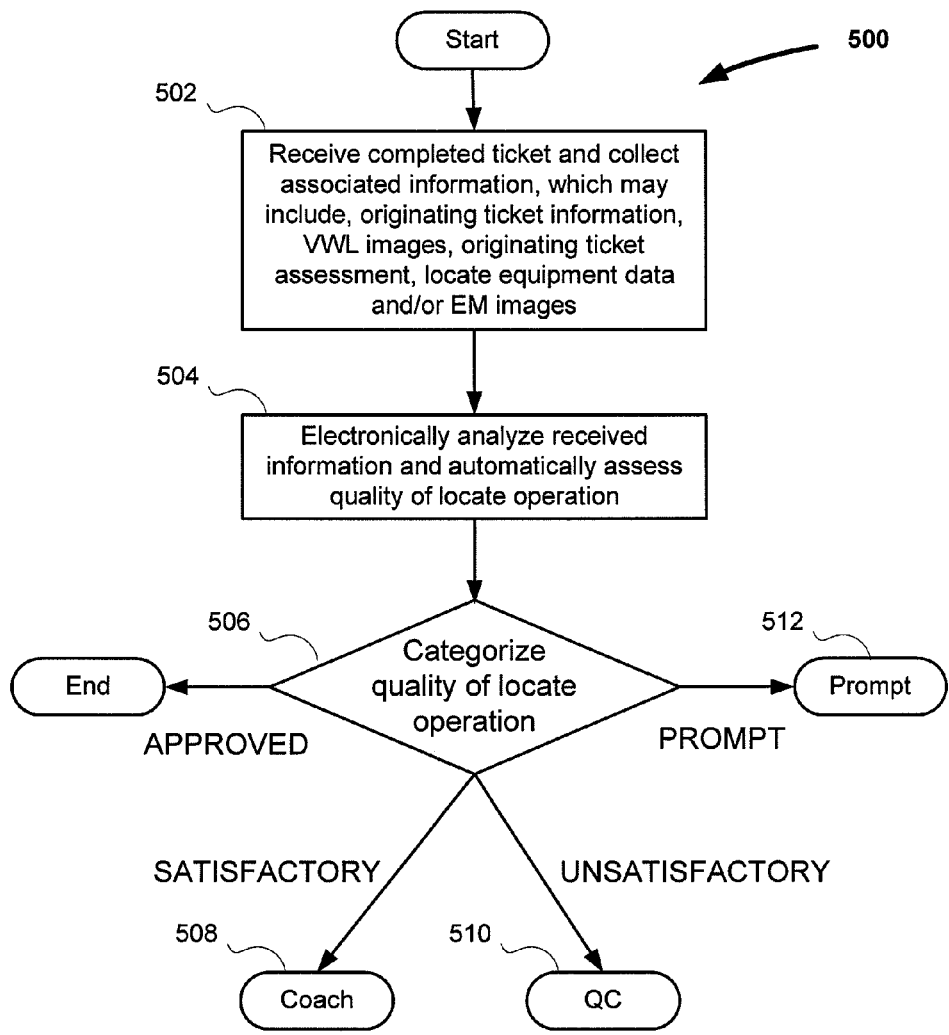
FIG. 5 illustrates a process for automatically performing quality control in underground facility locate applications, in accordance with some embodiments of the present disclosure.

FIG. 5 shows an illustrative process 500 for performing a quality assessment of an underground facility locate and/or marking operation, for example, as implemented by the automated quality assessment application 210 shown in FIGS. 2 and 4. While the example provided in FIG. 5 is a more specific example of the generic process 300 discussed above in connection with FIG. 3, and describes an automated quality assessment based on a completed or closed ticket for which it is presumed that a locate and/or marking operation was actually performed by a technician, it should be appreciated that the concepts generally outlined in the process 500 may be applied to various types of available information relating to a requested locate and/or marking operation, whether performed separately or in tandem, and irrespective of actual performance of the locate operation and/or the marking operation, so as to assess the quality of the requested operation.

The process 500 begins at act 502, where a closed (i.e., completed) ticket is received by the automated quality assessment application 210 for review and assessment. In response, the automated quality assessment application 210 may collect information associated with the received ticket from any number of the data sources 220 described above and shown in FIG. 4, and may use the collected information at act 504 to assess the quality of one or more locate and/or marking operations performed in connection with the ticket. For example, the automated quality assessment application 210 may automatically compare electronic data relating to a locate and/or marking operation pending assessment against reference information derived from or relating to one or more archived records of historical tickets.

The process 500 then continues to act 506 to categorize the quality of the locate and/or marking operation pending assessment. In this example, the locate and/or marking operation is categorized into one of the four categories discussed above in connection with FIG. 4: (a) APPROVED, (b) SATISFACTORY, (c) UNSATISFACTORY, or (d) PROMPT. Depending on the categorization, the process 500 may or may not proceed with additional processing. For example, if the category APPROVED is assigned to the locate and/or marking operation, the process 500 may end without taking further actions. On the other hand, if the category SATISFACTORY or the category UNSATISFACTORY is assigned to the locate and/or marking operation, the process 500 may, respectively, route the ticket to coaching or QC personnel for further review (act 508 or act 510). If the category PROMPT is assigned to the locate and/or marking operation, the process 500 may proceed to act 512 to route a real-time prompt to an appropriate originating locate technician.

Examples of processes that may be performed to automatically assess the quality of a locate and/or marking operation (e.g., act 504) and to generate an indication of quality (e.g., act 506) will be discussed in greater detail below. However, it should be appreciated that the present disclosure is not limited to these particular examples, and that such examples are provided primarily for the purposes of illustration.

II. Examples of Information Relevant for Comparison

According to some inventive aspects of the present disclosure, an automated quality assessment application (e.g., the automated quality assessment application 210 shown in FIGS. 2 and 4) may automatically review a variety of field information, which may include a "closed" or "completed" ticket (e.g., a ticket for which the entire scope of requested work has been performed during one or more locate and/or marking operations). The closed tickets may be reviewed in essentially real time and/or within a specified amount of time, such as within one day, from the ticket being closed, and/or at other times thereafter.

As part of the review and assessment process, the automated quality assessment application may compare information pertaining to the ticket pending quality assessment (hereafter the "current" ticket) against reference information derived from or relating to one or more archived records of previously completed and/or reviewed tickets (hereafter the "historical" tickets). For example, in some embodiments, the reference information may comprise data relating to one or more previous (or "historical") locate and/or marking operations conducted at the same work site as a current locate and/or marking operation (i.e., a locate and/or marking operation performed in connection with the current ticket). Alternatively, or additionally, the reference information may comprise data relating to one or more historical locate and/or marking operations conducted at work sites different from, but in close proximity to, the work site of the current locate and/or marking operation. For example, the different work sites may subsume and/or overlap the work site of the current locate and/or marking operation.

As another example, the reference information may comprise data relating to historical locate and/or marking operations performed by the same technician (or the same unit/group of technicians) as the current locate and/or marking operation, at a same work site or even different work sites.

As yet another example, the reference information may comprise data relating to historical locate and/or marking operations involving the same type (or types) of underground facilities (e.g., gas) as the current locate and/or marking operation. In sum, a historical ticket may be deemed relevant for the review and assessment of a current ticket for a variety of different reasons, and the present disclosure is not limited in this respect.

As yet another example, the reference information may comprise data relating to historical locate and/or marking operations performed at work sites having one or more similar characteristics compared to the work site of the current locate and/or marking operation. Examples of characteristics may include, but are not limited to, urban/suburban/rural environment, terrain condition, access restriction (e.g., military bases and/or gated community) and the like.

Depending on its availability, any suitable type of information may be compared between a current ticket and one or more relevant historical tickets. In many instances, a historical record (e.g., a record pertaining to a historical locate and/or marking operation) and a current record (e.g., a record pertaining to a current locate and/or marking operation) may contain similar types of information, including, but not limited to, location information, facility type information, and/or other information relating to one or more facilities identified and/or marked during a locate and/or marking operation. The comparison between the current and historical records may generally involve determining whether the actions taken by a locate technician during the current locate and/or marking operation are consistent with those taken during the historical locate and/or marking operations, and whether there is agreement between the outcomes of the respective locate and/or marking operations (e.g., whether the same types of marking materials are applied at substantially the same locations).

Various types of information that may be compared between a current ticket and one or more relevant historical tickets are discussed in greater detail below. It should be appreciated that these examples are provided primarily for purposes of illustration, and that comparisons based on other suitable information types are also contemplated. Additionally, some of the information contents discussed below may not be used directly in a comparison. Rather, they may be used as contextual information when interpreting comparison results; for example, a certain level of discrepancy between a current record and a historical record may be deemed insignificant under one set of circumstances, but, under a different set of circumstances, the same level of discrepancy may be deemed sufficient to trigger a coaching or QC action. Additionally, it should be appreciated that some of the information contents discussed below may be used for "pre-processing" or conditioning one or both of the field information relating to current tickets and the reference information relating to historical tickets.

A. Initial Tickets

As discussed above, an automated quality assessment application may look to a locate request ticket received from a one-call center (e.g., the one-call center 120 shown in FIG. 1) for information that may be useful in quality assessment. Hereafter, a locate request ticket as received from a one-call center is referred to as an "initial" ticket, to be distinguished from a "closed" ticket, which may contain additional information regarding the work performed in response to the initial ticket.

In some embodiments, an initial ticket may include information provided by an excavator in an excavation notice that initiated the ticket, as well as supplemental information provided by a one-call center that generated the ticket. FIG. 6 shows an example of such an initial ticket 600, which contains various pieces of information stored in a number of fields, including:

- ticket number 602,
- location information 604A (e.g., address of work site and nearby cross streets and/or a dig area description such as "mark perimeter of building") and 604B (e.g., lat/long coordinates of work site),
- excavation information 606, including reason (e.g., installing conduit), scope (e.g., 392 feet), depth (e.g., 18-30 inches), method (e.g., by drill and trencher) and property type (e.g., private property),
- timing information 608, including scheduled excavation time (e.g., Jan. 6, 2008 at 7:00 a.m.) and duration (e.g., 3 days) and due date by which a requested locate and/or marking operation is to be completed (e.g., Jan. 5, 2008),
- excavator information 610, including name, address, contact information such as phone number, fax number and email address, and the party who contracted the excavator (e.g., as indicated in the "Work Being Done For" field),
- one-call center information 612, including the time at which the ticket was created and the customer service representative who created the ticket, and
- member codes 614, indicating the different types of facilities that need to be located.

In some instances, the initial ticket 600 may contain additional textual information in a "Remarks" field 616 (although no remarks are provided in the example shown in FIG. 6). This textual information may include a description of the dig area (which may alternatively be included in the location information 604A as discussed above) and/or instructions with respect to performing the requested locate and/or marking operation.

It should be appreciated that the above list of information elements is merely illustrative, as other combinations of information elements may also be suitable. For example, when preparing an initial ticket, a one-call center may draw a polygon (e.g., as a "buffer zone" around a designated work site) on a map corresponding to the work site. This polygon may be overlaid onto one or more polygon maps or facilities maps to determine which types of facilities are implicated. For example, a facility type (or owner) may be indicated on the initial ticket in the member code section 614 if and only if at least one facility of that type (or owner) touches or intersects with the polygon overlaid on a polygon map or facilities map. In some instances, the one-call center may provide coordinates for the vertices of the polygon in the initial ticket, along with other information describing the location and boundaries of the work site and/or dig area.

B. VWL Images and Associated Data

Textual descriptions of dig areas included in locate request tickets may, in some instances, be very imprecise as to exact physical locations at which digging is planned. Therefore, when a locate request is submitted by an excavator, it may be beneficial for the excavator to supplement the locate request with a visit to the site of the dig area for the purpose of indicating the particular location and/or extent of the proposed excavation. For example, marks (e.g., white paint) on the ground at the location at which digging is planned may be used to physically indicate a dig area in order to communicate to a locate technician the extent of the boundaries where digging is planned. These marks may be chalk marks or paint that is applied to the surface of the ground, and are generally known as "white lines."

Figure 7:
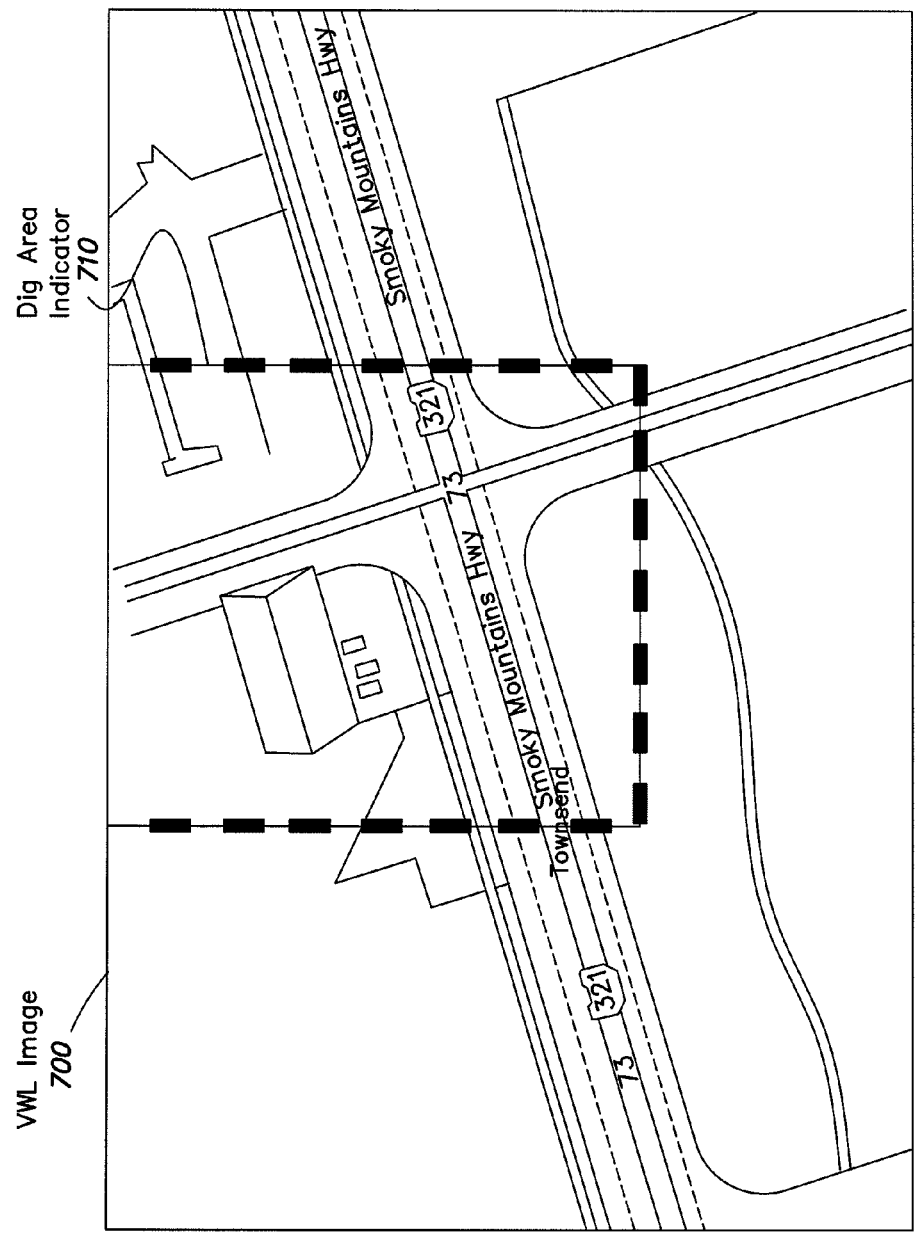
FIG. 7 illustrates a virtual white lines (VWL) image in which a dig area is indicated on an aerial image of a work site by a set of dashed lines, in accordance with some embodiments of the present disclosure.

In accordance with some embodiments, an excavator may attach to a locate request ticket a so-called virtual white lines (VWL) image, which may contain a digital image of the work site (or some other suitable digital data representing the geographic location of the work site) along with electronic annotations delimiting the dig area. An example of a VWL image 700 is shown in FIG. 7, where a dig area is indicated on an aerial image of a work site by a set of dashed lines 710 forming a rectangle. The lines 710 are more generally referred to as "dig area indicators," which may be any electronically generated markings indicating a point, line, path and/or area of the planned excavation.

The VWL image 700 may be created by the excavator using a suitable VWL application (e.g., the VWL application 430 shown in FIG. 4). For example, an excavator may use an electronic drawing tool provided by the VWL application to electronically draw markings on a digital aerial image of the work site, instead of, or in addition to, physically visiting the work site and marking white lines on the ground. The electronic markings may include any suitable combinations of shapes, shades, points, symbols, coordinates, data sets, and/or other indicators to indicate on the digital image a dig area in which excavation is to occur.

In some embodiments, the digital image on which dig area indicators are drawn may be geotagged (i.e., associated with geospatial metadata). The VWL application may be programmed to use the geospatial metadata associated with the digital image to convert location information regarding the dig area indicators and/or landmarks shown in the digital image into geographic coordinates such as Global Positioning System (GPS) coordinates. These geographic coordinates may be stored in a separate data set that may be attached to a locate request ticket instead of, or in addition to, the VWL image.

Figure 8:
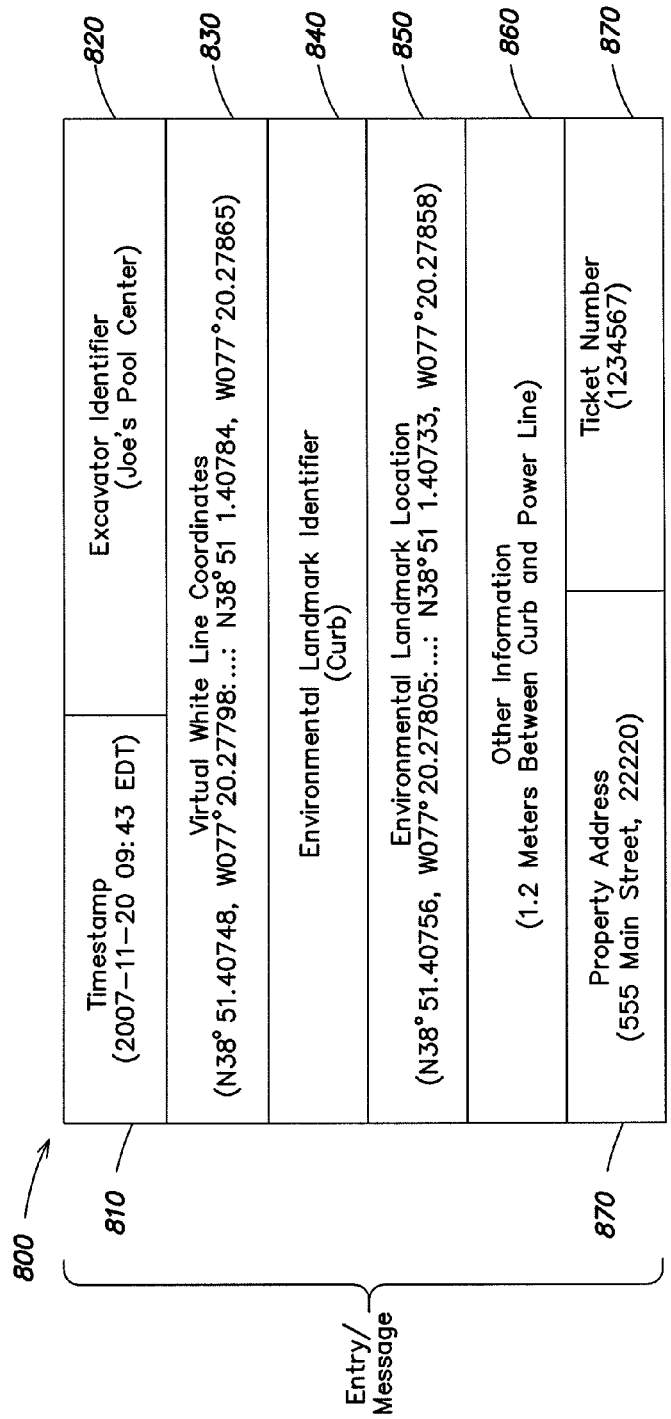
FIG. 8 illustrates a data set that may be stored and/or transmitted in connection with a VWL image, in accordance with some embodiments of the present disclosure.

FIG. 8 shows an example of a data set 800 that may be stored and/or transmitted in connection with a VWL image. As shown, the data set 800 may include a timestamp field 810, an excavator identifier field 820, a dig area coordinates field 830, an environmental landmark identifier field 840, an environmental landmark location field 850, an other information field 860, a property address field 870, and a ticket number field 880. In another implementation, the data set 800 may include additional, fewer, or different fields.

The timestamp field 810 may include time data that identifies the day and/or time that the completed locate request was submitted, which may be useful in establishing when a locate request was initiated. In the example of FIG. 8, the time data is shown as 9:43 a.m. Eastern Standard Time on Nov. 20, 2007, although other types of date and/or time code may also be used.

The excavator identifier field 820 may include an identifier that uniquely identifies the entity submitting the locate request. In the example of FIG. 8, the identifier is shown as "Joe's Pool Center," although other types of identifiers may also be used.

The virtual white line coordinates field 830 may include geographical information corresponding to the delimited dig area, which may be useful in graphically presenting the dig area on a digital image. In one implementation, the geographical information corresponding to the delimited dig area may identify a set of geographical points along a perimeter of the delimited dig area, as defined by the VWL coordinates. In the example of FIG. 8, the geographical information corresponding to the delimited dig area include coordinates N38°51.40748, W077°20.27798; . . . ; N38°51.40784, W077°20.27865, although other types of geographical information may be also used.

The environmental landmark identifier field 840 may include an identifier that identifies a type of environmental landmarks, for example, "curb," as shown FIG. 8, although other types of identifiers may also be used. The environmental landmark location field 850 may include geographical information corresponding to the environmental landmark identified in the environmental landmark identifier field 840. In the example of FIG. 8, the geographical information corresponding to the environmental landmark include coordinates N38°51.40756, W077°20.27805; . . . ; N38°51.40773, W077°20.27858, although other types of geographical information may also be used.

The other information field 860 may include any other data that may be useful in further describing the dig area. For instance, the other information field 860 may include distance information identifying a distance between one or more environmental landmarks and one or more boundaries of the dig area. In the example of FIG. 8, the distance information is shown as "1.2 meters between curb and edge of dig area." Additionally and/or alternatively, the other information field 860 may include user notes in the form of audio/voice data, transcribed voice-recognition data, or simply textual data typed in by a user.

The property address field 870 may include, for example, the street address and zip code of a property associated with the work site. Other information in the field 870 may include city, state, and/or county identifiers. The ticket number field 880 may include a ticket number associated with the locate request, such as ticket number "1234567" shown in FIG. 8. In some instances, the ticket number may not be known at the time the data set 800 is provided, and thus the ticket number 880 may be added to the data set 800 at a later time.

The VWL application may be implemented, for example, as described in U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" U.S. patent application Ser. No. 12/422,364 filed Apr. 13, 2009, entitled "Virtual white lines (VWL) application for indicating a planned excavation or locate path." Each of these patent applications is hereby incorporated by reference herein in its entirety.

C. Ticket Assessment Outcomes

In some further embodiments, initial tickets received from a one-call center may be assessed by a ticket assessment engine prior to being dispatched to locate technicians. The ticket assessment engine may be programmed to derive useful information from initial tickets that may not be directly available and/or ascertainable from the initial tickets themselves. A number of different types of assessments may be performed, including, but not limited to, the following.

Location: Location of planned excavation (or, equivalently, location of work site). In some instances, insufficient location information may be provided in a locate request ticket. For example, a location description may be vague or ambiguous (e.g., a street name without any house numbers). As another example, multiple conflicting pieces of location information may be given (e.g., a street address and a pair of lat/long coordinates that do not match). In these situations, additional analysis may be needed to ascertain the location of the work site.

Scope: Amount and nature of work. For example, the size of a dig area, as measured in length or in area, may be indicative of the scope of a requested locate and/or marking operation. The depth of excavation and the number of different facilities involved may also be relevant.

Complexity: Complexity involved in performing a locate and/or marking operation. For example, a locate and/or marking operation may be classified as high complexity when a high profile facility asset (e.g., fiber-optic communication cables) is involved or when the work site is in a restricted access area (e.g., a military base or gated community).

Duration: Amount of time needed to perform a locate and/or marking operation, which may be determined by scope (e.g., the number and types of different facilities involved) and/or complexity (e.g., delays due to access restrictions).

Risk: Potential liability for damages when a locate service provider is at fault (e.g., failing to complete a locate and/or marking operation by a required deadline or inadequately performing a location operation). For example, a locate and/or marking operation involving one or more main utility lines (e.g., water mains serving an entire neighborhood) may be considered high risk, while a locate and/or marking operation involving only service lines (e.g., utility lines leading to a customer's premise) may be considered low risk.

Value: Business value created by performing a locate and/or marking operation. In some embodiments, value may simply be the revenue collected for the locate and/or marking operation. In other embodiments, various operating costs may be subtracted from the revenue. In some further embodiments, a more sophisticated measure such as value at risk may be used.

Skill requirements: Personnel skill level or certification required to perform a locate and/or marking operation. For example, in some jurisdictions, only a technician with gas certification may be dispatched to perform a locate and/or marking operation involving gas pipes. In some embodiments, personnel skill level may encompass both long term measurements, such as years of experience, and short term measurement, such as recent performance evaluations.

Equipment requirements: One or more equipment required to adequately perform a locate and/or marking operation, which may be influenced by scope and/or complexity. For example, the types of facilities may influence the types of locate equipment (e.g., a locate device, a marking device, and/or a combined locate and marking device) that may be appropriate for a particular locate and/or marking operation. As another example, a manhole cover hook (for opening a manhole) and/or a gas monitor may be required when it is determined that a locate technician may need to enter a manhole in order to perform a locate and/or marking operation.

In some embodiments, the ticket assessment engine may be programmed to provide an estimated measurement, ranking, score, classification and/or some other suitable value for each of the assessment targets listed above, or any other desirable assessment targets. These outcomes may be stored in association with the initial ticket (e.g., in a database indexed by ticket number), and may be provided to an automated quality assessment application (e.g., the automated quality assessment application 210 shown in FIGS. 2 and 4) in any suitable manner.

D. Closed Tickets

In some embodiments, an automated quality assessment application may review information submitted by a locate technician who performed a locate and/or marking operation in connection with a ticket. A ticket including such information is referred to herein as a "closed ticket." For example, upon completion of the requested locate and/or marking operation, the technician may close the ticket by submitting, either electronically or on paper, a record that provides certain details regarding the locate and/or marking operation. This record may contain any suitable information, such as any number of the following items: ticket number, work order number (when a ticket involves multiple work orders), locate technician name or identifier, time of completion, place of completion, types of facilities that the technician attempted to locate (e.g., as indicated by facility owner member codes), types of facilities actually located, locate marks used and technician signature. Any or all of this information may be stored in association with the closed ticket (e.g., in a database indexed by ticket number), and may be made available to the automated quality assessment application.

In addition to textual information, one or more images captured at the work site may also be collected and stored in association with the ticket. For example, in the process of performing a requested locate and/or marking operation, a locate technician may use an image capture mechanism (e.g., a digital camera) to capture one or more images showing:

a street number on a building at or near the work site, a paper record summarizing the locate and/or marking operation and signed by the locate technician, and/or locate marks placed in the dig area (e.g., paint on the ground).

These images may be stored along with any textual information submitted by the locate technician and be accessed by an automated quality assessment application when evaluating the closed ticket.

As discussed above in connection with FIG. 4, an automated quality assessment application may access one or more electronic manifests associated with a closed ticket. In some embodiments, an electronic manifest may be a comprehensive electronic record of a closed ticket and its associated locate and/or marking operation(s) and may be generated using an electronic manifest application (e.g., the EM application 460 shown in FIG. 4). Illustrative implementations of an electronic manifest application are described in U.S. patent application Ser. No. 12/369,232, filed Feb. 11, 2009, entitled "Searchable records of underground facility locate marking operations," which is incorporated by reference herein in its entirety.

An electronic manifest may contain any suitable types of information, such as the textual and graphical information discussed above in connection with closed tickets. Additionally, or alternatively, an electronic manifest may include an electronic manifest image, which may be a digital image of the dig area and its surroundings with one or more "electronic locate marks" added to indicate corresponding physical locate marks that have been placed at the work site. These electronic locate marks therefore may indicate both the geographical locations and the types of the facilities that are present (or absent) in the dig area.

In some embodiments, an electronic manifest application may receive as input one or more VWL images that are associated with a ticket. As discussed above in connection with FIG. 7, an VWL image may be a digital aerial image having thereon electronic markers (or dig area indicators) that delimit the dig area. The electronic manifest application may further receive locate mark information indicating approximate geographical locations of physical locate marks that have been placed at the work site by a locate technician. Based on the received locate mark information, as well as any geographical information associated with the VWL image, the electronic manifest application may add to the VWL image one or more locate mark indicators at the appropriate locations.

In some locate and/or marking operations, no facilities are determined to be present in a designated dig area. Such a locate and/or marking operation is sometimes referred to as a "clear." According to some embodiments, an input image may nonetheless be employed to provide an electronic record of a "clear." More specifically, although no locate mark indicators may be added to an input image, other non-image information associated with the "clear" locate and/or marking operation (e.g., a timestamp of when the locate and/or marking operation was performed, an identifier for a technician or locate company performing the locate and/or marking operation, a text address or other geographical identifier for the dig area, a location stamp, etc.) may be associated with the input image (e.g., as a separate data set linked to the input image, as metadata, in a combined file of image and non-image data, etc.) to create a searchable electronic record that may be consulted to verify that the locate and/or marking operation was indeed completed, even though no facilities were found.

Figure 9:
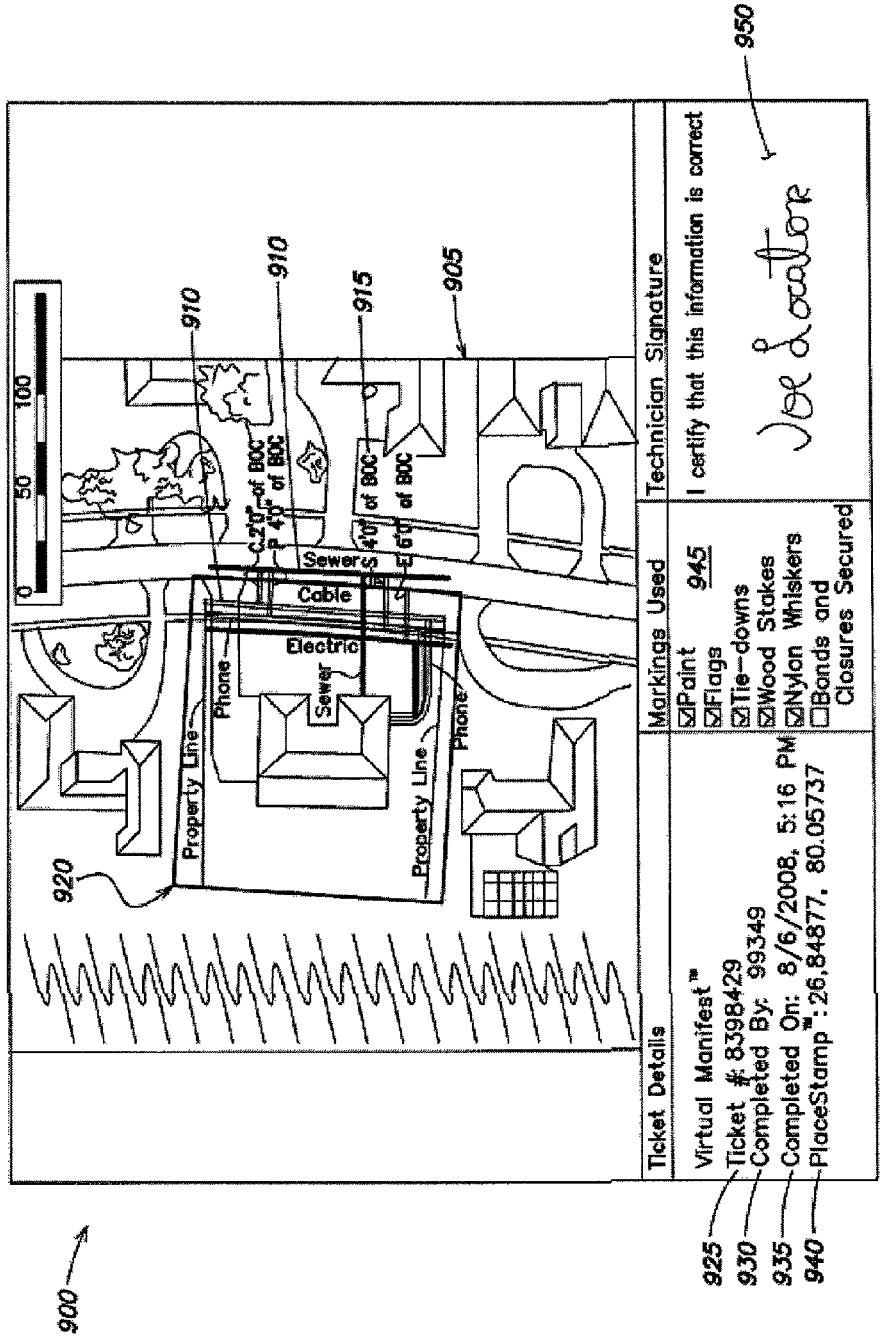
FIG. 9 illustrates an electronic manifest comprising both image data and non-image data relating to a locate and/or marking operation, in accordance with some embodiments of the present disclosure.

FIG. 9 shows an example of an electronic manifest 900 that comprises both image data and non-image data. In this example, the electronic manifest 900 comprises a marked-up image 905 showing locate mark indicators 910 (e.g., to indicate locations of physical locate marks), offset indicia 915 (e.g., to indicate distances between physical locate marks and certain environmental landmarks) and dig area indicators 920 (e.g., as provided by an excavator on a VWL image). In addition, the electronic manifest 900 comprises non-image information relating to the locate and/or marking operation, such as a ticket number or identifier 925, a name or identifier 930 associated with the locate technician (which may indicate facility owner/operator, or locate company/technician), a time and date stamp 935 indicating when the electronic manifest was created, a location stamp 940 indicating where the electronic manifest was created, a completed checklist 945 of markings used in the locate and/or marking operation, and a locate technician signature 950 certifying that the information of the electronic manifest is correct.

Although FIG. 9 shows an example of an electronic manifest including specific types of ticket information, it should be appreciated that an electronic manifest as described herein is not limited in this regard, and may alternatively include other combinations of ticket information. Also, an electronic manifest may be displayed and/or formatted in manners different from the example shown in FIG. 9.

The underlying electronic data used to generate an electronic manifest (e.g., the electronic manifest 900 shown in FIG. 9) may be represented and/or stored in any suitable manner, as the present disclosure is not limited in this respect. In some embodiments, the marked-up image(s) and the non-image information may be stored as a single file. For example, the non-image information may be included as metadata associated with the marked-up image(s). In other embodiments, the marked-up image(s) and the non-image information may be formatted as separate data sets and may be transmitted and/or stored separately. In another aspect, whether transmitted/stored separately or together, the marked-up image(s) and the non-image information may be linked together in some manner as relating to a common electronic record.

FIG. 10 shows an example of a data set 1000 that may be used to generate an electronic manifest. In this example, the data set 1000 may include a timestamp field 1010, a facility type identifier field 1020, a facility mark location field 1030, an environmental landmark identifier field 1040, an environmental landmark location field 1050, an other information field 1060, a facility owner/operator field 1065, a marking method field 1070, a property address field 1080, a ticket number field 1090, a location stamp field 1015, and a certification field 1025.

Although FIG. 10 shows specific examples of information fields, it should be appreciated that the present disclosure is not limited in this regard. In other implementations, the data set 1000 may include additional, fewer, or different fields.

The timestamp field 1010 may include time data that identifies the day and/or time that a locate and/or marking operation is performed. This may coincide with a time at which an environmental landmark location is identified in connection with the dig area. The time data in the timestamp field 1010 is shown in FIG. 10 as 9:43 a.m. on Oct. 20, 2005, although any type of date and/or time code may be used. The information in timestamp field 1010 may be useful in establishing when a locate and/or marking operation occurred.

The facility type identifier field 1020 may include an identifier that identifies a type of underground facility that is being marked. The identifier in the facility type identifier field 1020 is shown in FIG. 10 as "power," although any type of identifier may be used. The facility mark location field 1030 may include geographical information corresponding to a physical locate mark. In some implementations, the geographical information may identify a set of geographical points along a marking path of a located facility line. The geographical information in the facility mark location field 1030 is shown in FIG. 10 as N38°51.40748, W077°20.27798; . . . ; N38°51.40784, W077°20.27865, although any type of geographical information may be used.

The information in the facility mark location field 1030 may be useful in graphically presenting the facility locate marks on a map, and/or to verify that the locate and/or marking operation was actually and accurately performed. Additionally, or alternatively, the facility mark location field 1030 may include geographical information for multiple facility locate marks.

The environmental landmark identifier field 1040 may include an identifier that identifies a type of environmental landmark being marked. The identifier in environmental landmark identifier field 1040 is shown in FIG. 10 as "curb," although any type of identifier may be used.

The environmental landmark location field 1050 may include geographical information corresponding to the environmental landmark identified in the environmental landmark identifier field 1040. The geographical information in the environmental landmark location field 1050 is shown in FIG. 10 as N38°51.40756, W077°20.27805; . . . ; N38°51.40773, W077°20.27858, although any type of geographical information may be used.

The other information field 1060 may store any other data that may be useful, including user notes, such as offset or distance information that identifies a distance between one or more environmental landmarks and one or more facility locate marks. The other information field 1060 is shown in FIG. 10 as including "1.2 meters between curb and power line," although any other data may be used. Additionally, or alternatively, the other information field 1060 may include audio/voice data, transcribed voice-recognition data, or the like to incorporate user notes.

The facility owner/operator field 1065 may include a name of the owner/operator of a facility that has been marked during the locate and/or marking operation. For example, in FIG. 10, the facility owner/operator field 1065 is shown as "ABC Corp." Because multiple facilities may be marked during a single locate and/or marking operation, it may be beneficial to associate each marked facility with a particular owner/operator. Alternatively, this field may include one or more identifiers for the locate company performing the locate and/or marking operation, or an additional field may be added to the data set 1000 for this purpose.

The marking method field 1070 may indicate a type of marking used at the dig area to indicate a location of a facility. For example, in FIG. 10, the marking method field 1070 is shown indicating red paint. The property address field 1080 may be the property address associated with the marking recorded in the data set 1000. The property address field 1080 may include, for example, the street address and zip code of the property. Other information in the field 1080 may include city, state, and/or county identifiers. The ticket number field 1090 may include a ticket number associated with the locate and/or marking operation associated with the data set 1000, such as the ticket "1234567" shown in FIG. 10.

The location stamp field 1015 may include a location stamp indicating a location where the locate and/or marking operation was performed (e.g., the dig area). The location stamp may optionally be generated at the same time as the timestamp 1010, and the information underlying these stamps may be from a same source or otherwise correlated, such that the location stamp reflects the location of the locate technician, a user device of the locate technician, or an associated locate and/or marking device when the timestamp 1010 is generated. The location stamp may comprise, for example, location coordinates (as shown in FIG. 10), a city name or designation, a state name or designation, a county name or designation, and/or an address. Generally, the location stamp may identify the presence and location of a locate technician in connection with the locate and/or marking operation.

According to some implementations, location stamp data may be generated by a user device of a locate technician in response to an action associated with a locate and/or marking operation (e.g., a marking being made on an electronic manifest, creation of a new electronic manifest, completion or certification of an electronic manifest). According to some further implementations, location stamp data is generated by a GPS-enabled device associated with a locate technician dispatched to perform a locate and/or marking operation (e.g., a GPS-enabled device in a vehicle and/or on the person of the locate technician), a GPS-enabled locate and/or marking device operated by the technician during the locate and/or marking operation, or a locate and/or marking device capable of determining its own location in some other suitable manner. The location stamp data may then be transmitted from the GPS-enabled device or locate and/or marking device to the user device of the locate technician, either alone or in association with other data (e.g. locate and/or marking data as discussed in greater detail below). The transmission may occur, for example, in response to a request by the user device, a request by the locate technician, or some other triggering action. The location stamp data may be recorded to the data set automatically (e.g., without user intervention) or in response to user input.

It should be appreciated that both the timestamp field 1010 and the location stamp field 1015 may optionally include a plurality of timestamps and location stamps. For example, each of a plurality of actions (e.g., markings on the electronic manifest, actuations of the locate and/or marking device) may be associated with a particular time stamp and/or location stamp recorded in the fields 1010 and 1015, so that the times and locations of various actions associated with the locate and/or marking operation can subsequently be determined. Each of these actions may cause the time stamp and/or location stamp to automatically be logged. Furthermore, the timestamp field 1010 and/or location stamp field 1015 may optionally be "read only" fields. Prohibiting changes to these fields (e.g., by the locate technician) may preserve the integrity of the data therein so that it can be reliably used for verification of the locate and/or marking operation.

The certification field 1025 may comprise a certification of the data in the data set 1000, for example, by the locate technician and/or another reviewer such as a supervisor or another authorized representative of the locate company. Such a certification may comprise a signature, initials, an electronic stamp, or some other indication that the information in the data set 1000 is "certified" (e.g., has been reviewed and/or is correct or approved).

In some implementations, a user device of a locate technician may store multiple data sets corresponding to multiple facilities identified at a particular dig area. The user device may provide the data sets to server 220 in a batch (e.g., corresponding to a group of facilities documented within a single electronic manifest) or individually. The batch may be grouped together with other information generally relating to the locate and/or marking operation, such as a name of the company responsible for performing the locate and/or marking operation, a name of the locate technician dispatched to perform the locate and/or marking operation, and the like. Additionally, or alternatively, other information generally relating to the locate and/or marking operation may be included in each data set.

E. Locating Equipment Data

As noted above, a locate technician may use locating equipment, such as a locate instrument set (including a locate receiver device), a marking device, or a combined locate and marking device, so as to perform a locate and/or marking operation. Locating equipment data (e.g., the locating equipment data 450 shown in FIG. 4) may be any information that is collected and/or generated (e.g., one or more electronic records) by any type of locating equipment equipped with components that are capable of collecting electronic information and/or creating electronic records about locate and/or marking operations that are performed in the field. In some examples, locating equipment data is constituted by "marking information" (e.g., the marking device data 452 shown in FIG. 4) that is associated generally with the marking functionality of a locate and/or marking operation, and/or "locate information" (e.g., the locate receiver data 454 shown in FIG. 4) that is associated generally with the locating/detection functionality of a locate and/or marking operation. Locating equipment data also may include "landmark information" that may be acquired by suitably configured locating equipment (e.g., a marking device, a locate device, or a combined locate and marking device capable of operating in a "landmark mode"), which information may be acquired either independently or as part of (e.g., during or proximate in time to) a locate and/or marking operation.

With respect to assessing a quality of a locate and/or marking operation by comparing locating equipment data obtained from the field (e.g., as part of "field data") to information derived from a reference electronic record (e.g., as part of "reference data") constituted by data derived from or relating to one or more historical records, in some exemplary embodiments discussed in greater detail below geographical information in the field data is compared to geographical information in the reference data. For example, geo-location data (e.g., GPS coordinates) relating to the detection and/or marking of a given facility during a locate and/or marking operation, and/or geo-location data relating to one or more environmental landmarks, may be compared to geo-location data in the reference electronic record.

It should be appreciated that the term "field data" (or "field information") may refer more broadly to data obtained from any suitable sources, and is not limited to data obtained from locate equipment. For example, field data may include information entered manually by a locate technician, and/or information dictated by the locate technician and transformed into text using any suitable automatic speech recognition application. As another example, field data may include one or more digital images captured at the work site (e.g., to show physical locate marks placed on the ground).

More specifically, in some implementations, field data such as GPS coordinates corresponding to a detected and/or marked facility and/or one or more environmental landmarks is compared to reference data such as GPS coordinates in a reference electronic record derived from or relating to geographic information in one or more historical records. The reference data may be transformed if necessary to a frame of reference common to the locating equipment data to enable a meaningful comparison.

In this manner, a correspondence or discrepancy (or degree of correspondence) may be ascertained between the field data and the reference data. For example, a set of GPS coordinates obtained from the field, constituting lines or curves representing facilities detected and/or marked during the locate and/or marking operation, and/or one or more GPS coordinates constituting points or polygons representing environmental landmarks, may be compared to a corresponding set of GPS coordinates in a reference electronic record to determine a degree of matching between the two sets, in a manner akin to pattern matching. Although comparisons of geo-location data in field data and reference data are described in some exemplary embodiments to facilitate an automated quality assessment process, it should be appreciated that other information contained in field data and reference data may be used as a basis for an automated quality assessment, as discussed in further detail below.

In some embodiments, marking device data may include electronic information and/or one or more electronic records of data that is provided by electronic marking devices and/or marking systems. Examples of electronic marking devices and/or marking systems that may provide marking device data may include, but are not limited, to those described in reference to U.S. patent application Ser. No. 11/696,606, filed Apr. 4, 2007 and published Oct. 9, 2008, entitled "Marking system and method;" U.S. patent application Ser. No. 11/685, 602, filed Mar. 13, 2007 and published Sep. 18, 2008, entitled "Marking system and method;" U.S. Non-provisional application Ser. No. 12/568,087, filed on Sep. 28, 2009, entitled "Methods and Apparatus for Generating an Electronic Record of Environmental Landmarks Based on Marking Device Actuations;" U.S. Non-provisional application Ser. No. 12/539,497, filed on Aug. 11, 2009, entitled "Methods and Apparatus for Generating an Electronic Record of a Marking Operation based on Marking Device Actuations;" U.S. Provisional Patent Application Ser. No. 61/102,151 filed Oct. 2, 2008, entitled "Data acquisition system for and methods of analyzing locate activities based on marking device actuations;" and U.S. Provisional Patent Application Ser. No. 61/151,574 filed Feb. 11, 2009, entitled "Marking device that has enhanced features for underground facility locate applications." Each of these applications is incorporated herein by reference in its entirety.

Table 1 shows one example of a sample of marking device data of locating equipment data that may be captured as the result of, for example, an actuation of a marking device. In some exemplary implementations, an electronic record of a marking operation may include multiple data entries as shown in the example of Table 1 for respective actuations of a marking device to dispense a marking material (e.g., in some cases there may be one set of data as shown in Table 1 for each actuation). In this manner, each time a marker is placed (so as to indicate a presence or absence of a given facility), data is collected relating to the geographic location of the placed marker (e.g., geo-location data). Additionally, data relating to a characteristic of the placed marker (e.g., color and/or brand) is included in the data entries of the electronic record, as well as other data germane to the marking operation.

TABLE 1

Example marking device data 1252 of locating equipment data 1250

| | |
|---|---|
| Service provider ID | 0482 |
| Locate technician ID | 4815 |
| Marking Device ID | 7362 |
| Timestamp data | 12-Jul-2008; 09:35:15.2 |
| Geo-location data | N35° 43.57518, W078° 49.78314 (deg. and dec. min.) |
| Marking material data | Color = Red, Brand = ABC |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 73% |

Table 2 below shows another example of marking device data that may be captured as the result of, for example, one or more actuations of a marking device. Specifically, Table 2 illustrates multiple "actuation data sets" of an electronic record of a marking operation as generated by a marking device, in which each actuation data set includes information associated with multiple actuation event entries logged during a corresponding actuation and dispensing of a locate mark. Table 2 shows three actuation data sets of an electronic record, corresponding to three actuations of the marking device (e.g., act-1, act-2, and act-3). As may be appreciated from the information shown in Table 2, multiple pieces of geo-location data are logged for each actuation of a marking device (in addition to various other information).

Figure 11:
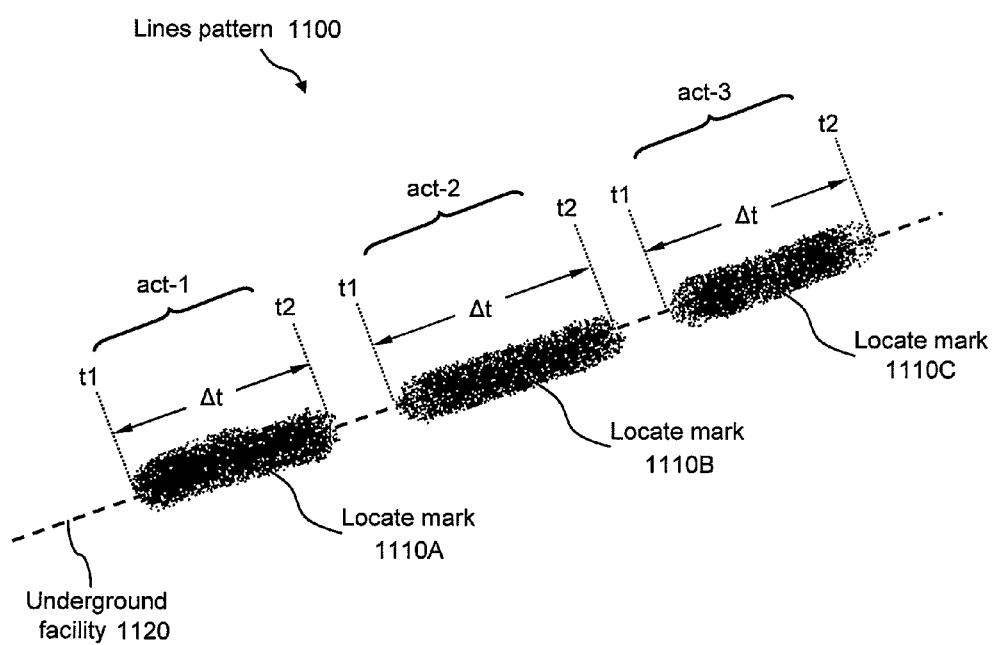
FIG. 11 illustrates a plurality of locate marks produced by a plurality of actuations of a marking device during a locate and/or marking operation, in accordance with some embodiments of the present disclosure.

FIG. 11 shows an example of a plurality of locate marks 1110A-C that may correspond respectively to the three data sets presented in Table 2 below. As shown in FIG. 11, the locate marks 1110A-C form part of a line pattern 1110 that indicate the presence of an underground facility 1120.

It should be appreciated that other types of marking patterns that may also be used in a locate and/or marking operation in addition to, or instead of, a line pattern such as the one shown in FIG. 11. For example, a "dotting" pattern may be utilized to quickly indicate the location of a target facility. The dotting pattern may be formed by dispensing marking material in one or more short bursts, whereas the line pattern may be formed by dispensing marking material in one or more extended bursts.

In some embodiments, the dotting pattern may be used during an initial stage of the process of locating the target facility, while the line pattern may be an end product of the locate and/or marking operation. The line pattern may extend the dotting pattern in order to create lines that indicate the presence or absence of an underground facility. These lines may then be utilized by the excavator to, for example, avoid damage to the facility.

TABLE 2

| | | |
|---|---|---|
| | Example actuation data set for act-1 | |
| act-1 | Service provider ID | 0482 |
| | User ID | 4815 |
| | Device ID | 7362 |
| | T1 timestamp data | 12-Jul-2008; 09:35:15.2 |
| | T2 timestamp data | 12-Jul-2008; 09:35:16.1 |
| | Duration (Δt) | 00:00:00.9 |
| | T1 geo-location data | 2650.9348, N, 08003.5057, W |
| | $1^{st}$ interval location data | 2650.9353, N, 08003.5055, W |
| | $2^{nd}$ interval location data | 2650.9356, N, 08003.5055, W |
| | . | . |
| | . | . |
| | . | . |
| | Nth interval location data | 2650.9246, N, 08003.5240, W |
| | T2 geo-location data | 2650.9255, N, 08003.5236, W |
| | Product data | Color = Red, Brand = ABC, Type/Batch = 224B-1 |
| | Locate request data | Requestor: XYZ Construction Company, Requested service address: 222 Main St, Orlando, FL |
| | Example actuation data set for act-2 | |
| act-2 | Service provider ID | 0482 |
| | User ID | 4815 |
| | Device ID | 7362 |
| | T1 timestamp data | 12-Jul-2008; 09:35:17.5 |
| | T2 timestamp data | 12-Jul-2008; 09:35:18.7 |
| | Duration (Δt) | 00:00:01.2 |
| | T1 geo-location data | 2650.9256, N, 08003.5234, W |
| | 1st interval location data | 2650.9256, N, 08003.5226, W |
| | $2^{nd}$ interval location data | 2650.9256, N, 08003.5217, W |
| | . | . |
| | . | . |
| | . | . |
| | Nth interval location data | 2650.9260, N, 08003.5199, W |
| | T2 geo-location data | 2650.9266, N, 08003.5196, W |
| | Product data | Color = Red, Brand = ABC, Type/Batch = 224B-1 |

TABLE 2-continued

| | Locate request data | Requestor: XYZ Construction Company, Requested service address: 222 Main St, Orlando, FL |
|---|---|---|
| | | Example actuation data set for act-3 |
| act-3 | Service provider ID | 0482 |
| | User ID | 4815 |
| | Device ID | 7362 |
| | T1 timestamp data | 12-Jul-2008; 09:35:18.7 |
| | T2 timestamp data | 12-Jul-2008; 09:35:19.8 |
| | duration ($\Delta t$) | 00:00:01.1 |
| | T1 geo-location data | 2650.9273, N, 08003.5193, W |
| | 1st interval location data | 2650.9281, N, 08003.5190, W |
| | $2^{nd}$ interval location data | 2650.9288, N, 08003.5188, W |
| | . | . |
| | . | . |
| | . | . |
| | Nth interval location data | 2650.9321, N, 08003.5177, W |
| | T2 geo-location data | 2650.9325, N, 08003.5176, W |
| | Product data | Color = Red, Brand = ABC, Type/Batch = 224B-1 |
| | Locate request data | Requestor: XYZ Construction Company, Requested service address: 222 Main St, Orlando, FL |

With regard to the marking material color information that may be included in the marking device data as exemplified in Tables 1 and 2, Table 3 shows an example of a mapping between marking material color and the type of facility to be marked.

TABLE 3

Correlation of color to facility type

| Marking material color | Facility Type |
|---|---|
| White | Proposed excavation |
| Pink | Temporary survey markings |
| Red | Electric power lines, cables or conduits, and lighting cables |
| Yellow | Gas, oil, steam, petroleum, or other hazardous liquid or gaseous materials |
| Orange | Communications, cable TV, alarm or signal lines, cables, or conduits |
| Blue | Water, irrigation, and slurry lines |
| Purple | Reclaimed water, irrigation and slurry lines |
| Green | Sewers, storm sewer facilities, or other drain lines |
| Black | Mark-out for errant lines |

In some embodiments, locate receiver data may be electronic information (e.g., one or more electronic records) of data that is provided by electronic locate receiver devices and/or systems. Examples of a locate receiver device that may provide locate receiver data are described in U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same;" U.S. Provisional Patent Application Ser. No. 61/151,578, entitled "Locating equipment that has enhanced features for increased automation in underground facility locate applications;" and U.S. Provisional Patent Application Ser. No. 61/102,122, filed on Oct. 2, 2008, entitled "Combination Locate and Marking Device With a Data Acquisition System Installed Therein, and Associated Methods," which applications are both hereby incorporated herein by reference in their entirety.

Table 4 below shows an example of a sample of locate receiver data that may be captured, for example, at one or more times during operation/use of an appropriately configured locate receiver. Different models of locate receivers and transmitters are available from a variety of manufacturers and have different features; accordingly, it should be appreciated that the information content and type provided in Table 4 is exemplary of possible information relating to locate receivers on which a quality assessment of a locate and/or marking operation may be based, and that other types and values for information are possible. With respect to information potentially provided by a given locate receiver as shown in Table 4 below, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate and/or marking operations.

In some illustrative implementations, an electronic record of a locate and/or marking operation as obtained from a locate receiver may include multiple data entries as shown in the example of Table 4. Each such entry may not only include information about various operating parameters of the locate receiver (e.g., signal strength, gain), but may additionally include location information (geo-location data) associated with detected facilities, as well as various environmental data. The logging of a given entry by a locate receiver may automatically result from one or more conditions (e.g., signal strength exceeding a particular threshold). Additionally, or alternatively, data entries may be manually logged by a technician using the locate receiver (e.g., via a push button, touch screen, trigger actuation, or other interaction facilitated by a user interface of the locate receiver). In this manner, multiple pieces of data may be collected for an electronic record of a locate and/or marking operation, including multiple pieces of geo-location data for a given underground facility detected via the locate receiver.

TABLE 4

Example locate receiver data 1254 of locating equipment data 1250

| Service provider ID | 0482 |
|---|---|
| Locate technician ID | 4815 |
| Locate Device ID | 7345 |

TABLE 4-continued

Example locate receiver data 1254 of locating equipment data 1250

| | |
|---|---|
| Timestamp data | 12-Jul-2008; 09:35:15.2 |
| Geo-location data | N35° 43.57518, W078° 49.78314 (deg. and dec. min.) |
| Locate mode | Mode = PASSIVE |
| Gain | 35 (on a scale of 1-100) |
| Sig. strength | 85% (on a scale of 0-100%) |
| Signal frequency | 60 Hz |
| Facility depth | 3.4 feet |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 85% |

In some other embodiments, both marking device data and locate receiver data may be electronic information (e.g., one or more electronic records) of data that is provided by a combined locate and marking device. An example of such a combined locate and marking device is described in U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same," and U.S. Provisional Patent Application Ser. No. 61/102,122, filed on Oct. 2, 2008, entitled "Combination Locate and Marking Device With a Data Acquisition System Installed Therein, and Associated Methods," which applications are both hereby incorporated herein by reference in their entirety.

Table 5 below illustrates a non-limiting example of four actuation data sets that may be collected in an electronic record generated by a combined locate and marking device, in which each data set corresponds, for example, to a separate actuation event to dispense marking material. It should be appreciated, however, that these are merely examples, and that various alternative electronic records may be generated according to the aspects of the invention, for example reflecting different types of information associated with operations of a combination locate and marking device.

Each of the four records of Table 5 includes general information not limited to either the locate receiver functionality or the marking functionality of a combination device. Examples of the general information include, but are not limited to, an identification of a locate service provider (Service provided ID), an identification of a locate technician (User ID), an identification of a locate and/or marking device (Device ID), and information about a requestor of the locate and/or marking operation and the requested address (Locate request data). In addition, an entry describing the mode of data collection (e.g., Manual) for the device may also be collected, which may indicate that information is logged into one or more records upon actuations of the combined locate and marking device. Information about an actuation itself, such as time of actuation (Timestamp data), actuation duration, and geographical location (geo-location data) at the start, during, and/or at and end of the actuation, may also be included. The data sets also include information relating to the locate receiver functionality of the combination locate and marking device, including a receiver detection mode (e.g., PEAK in Table 5), the strength of a detected signal, and the frequency of the detected signal. Information relating to a depth measurement (e.g., Facility depth) may also be included, as well as information about the marking material to be dispensed by the combination locate and marking device. Again, it should be appreciated that Table 5 is an illustration of one electronic record including multiple data sets that may be generated in association with the operations of a combination locate and marking device, and that other forms of electronic records are also possible.

TABLE 5

Electronic Record for Combination Locate and Marking Device

| | | |
|---|---|---|
| Record #1001 | Service provider ID | 0482 |
| | User ID | 4815 |
| | Device ID | 7362 |
| | Device mode | Mode = MANUAL |
| | Timestamp data | 12-Jul-2008; 09:35:15 |
| | Actuation duration | 0.5 sec |
| | Start actuation location data | 2650.9348, N, 08003.5057, W |
| | End actuation location data | 2650.9353, N, 08003.5055, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |
| Record #1002 | Service provider ID | 0482 |
| | User ID | 4815 |
| | Device ID | 7362 |
| | Device mode | Mode = MANUAL |
| | Timestamp data | 12-Jul-2008; 09:35:18 |
| | Actuation duration | 0.4 sec |
| | Start actuation location data | 2650.9256, N, 08003.5234, W |
| | End actuation location data | 2650.9256, N, 08003.5226, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |
| Record #1003 | Service provider ID | 0482 |
| | User ID | 4815 |
| | Device ID | 7362 |
| | Device mode | Mode = MANUAL |
| | Timestamp data | 12-Jul-2008; 09:35:21 |
| | Trigger pull duration | 0.5 sec |
| | Start actuation location data | 2650.9273, N, 08003.5193, W |
| | End actuation location data | 2650.9281, N, 08003.5190, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |

TABLE 5-continued

Electronic Record for Combination Locate and Marking Device

| Record # 1004 | Service provider ID | 0482 |
|---|---|---|
| | User ID | 4815 |
| | Device ID | 7362 |
| | Device mode | Mode = MANUAL |
| | Timestamp data | 12-Jul-2008; 09:35:25 |
| | Actuation (actuation) duration | 0.5 sec |
| | Start actuation location data | 2650.9321, N, 08003.5177, W |
| | End actuation location data | 2650.9325, N, 08003.5176, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |

While the collection and logging of locate information and marking information to generate an electronic record is discussed in some aspects, for purposes of illustration, in terms of actuation data sets (sets of data that are associated and logged with corresponding actuations of a locate device, marking device, or combined locate and marking device), it should be appreciated that electronic records as discussed herein are not limited in this respect. More generally, an electronic record of a locate and/or marking operation may be generated in any of a variety of manners, may have a variety of file formats and/or data structures, and may include any of a variety of locate information and/or marking information (some of which may be germane to one or more actuations of a device, some of which may be common to multiple actuations or the overall locate and/or marking operation in general, and some of which may not be related to specific actuations). For example, in some illustrative implementations, electronic records may be a "flat files" including a succession of time-stamped "event entries" of various locate information and/or marking information (logged automatically as a result of one or more particular conditions, e.g., exceeded thresholds for various signals, or manually as a result of user actuation of a device), or a differently formatted file (e.g., an ASCII file, an XML file) having a data structure that segregates or separates in some manner the locate information and/or marking information into multiple different fields.

It should also be appreciated that one or both of the marking device data and the locate receiver data, received from any of the marking devices, locate devices, or combined locate and marking devices referenced above, may include landmark information (in addition to, or instead of, locate information and marking information). Landmark information may include any information relating to one or more environmental landmarks of interest (e.g., in and around the work site/dig area and/or generally in the vicinity of the locate and/or marking operation). Examples of landmark information include, but are not limited to, geo-location data of an environmental landmark, a type of environmental landmark, and a time stamp for any acquired information relating to an environmental landmark. In some instances, landmark information may be acquired from locate equipment particularly configured to operate in a landmark mode so as to acquire such information, as well as one or more other modes (e.g., "locate mode" or "marking mode") to accomplish functions relating to detection and/or marking of underground facilities.

Tables 6 and 7 below show examples of landmark information that may be included in an electronic record forming part of either the marking device data or the locate receiver data. Table 6 shows the format and content of an electronic record entry for a utility pole, which includes one geo-location data point, and Table 7 shows the format and content of an electronic record entry for a pedestal, which includes four geo-location data points (i.e., one for each corner of the pedestal). As noted above, it should be appreciated that the formats and contents shown below in Tables 6 and 7 are provided primarily for purposes of illustration, and that a variety of formats and content may be employed for an electronic record entry for landmark information.

TABLE 6

Example record of landmark information acquired for a utility pole

| Record # 1 | Service provider ID | 0482 |
|---|---|---|
| | User ID | 4815 |
| | Device ID | 7362 |
| | Type of EL | Type = utility pole |
| | timestamp data | 12-Jul-2008; 09:35:17.5 |
| | geo-location data | 2650.9256, N, 08003.5234, W |
| | Locate request data | Requestor: XYZ Construction Company, Requested service address: 222 Main St, Orlando, FL |

TABLE 7

Example record of landmark information acquired for a pedestal

| Record # 2 | Service provider ID | 0482 |
|---|---|---|
| | User ID | 4815 |
| | Device ID | 7362 |
| | Type of EL | Type = pedestal |
| | timestamp data | 12-Jul-2008; 09:35:17.5 |
| | geo-location data | 2650.9256, N, 08003.5234, W |
| | Type of EL | Type = pedestal |
| | timestamp data | 12-Jul-2008; 09:35:21.2 |
| | geo-location data | 2650.9256, N, 08003.5226, W |
| | Type of EL | Type = pedestal |
| | timestamp data | 12-Jul-2008; 09:35:26.7 |
| | geo-location data | 2650.9288, N, 08003.5188, W |
| | Type of EL | Type = pedestal |
| | Timestamp data | 12-Jul-2008; 09:35:33.5 |
| | geo-location data | 2650.9321, N, 08003.5177, W |
| | Locate request data | Requestor: XYZ Construction Company, Requested service address: 222 Main St, Orlando, FL |

G. Facilities Maps

In some embodiments, an automated quality assessment application (e.g., the automated quality assessment application 210 shown in FIGS. 2 and 4) may access one or more facilities maps illustrating installed underground facilities and street-level landmarks. The facilities maps may be any physical, electronic, or other representation of the geographic location, type, number, and/or some other suitable attributes of a facility or facilities. The facilities maps may be supplied by various facility owners/operators and may indicate the geographic location of facility lines (e.g., pipes, cables, and the like). For example, the facilities maps may be supplied by owners of gas facilities, power facilities, telecommunications facilities, water and sewer facilities, and so on.

In some instances, facilities maps may be geotagged, which may enable overlaying a polygon or dig area indicator onto a facilities map to determine whether one or more items on the facilities map fall within the dig area or are sufficiently close to the dig area. The automated quality assessment application may aggregate information contained in multiple facilities maps, for example, to determine all facilities that are supposedly present at a certain dig area.

III. Comparisons Between Field Data and Historical Reference Data

As discussed above, an automated quality assessment application may assess the quality of a current ticket, for example, by assessing the quality of one or more completed locate and/or marking operations associated with the current ticket. Such locate and/or marking operations are herein referred to "current locate and/or marking operations."

Figure 12:
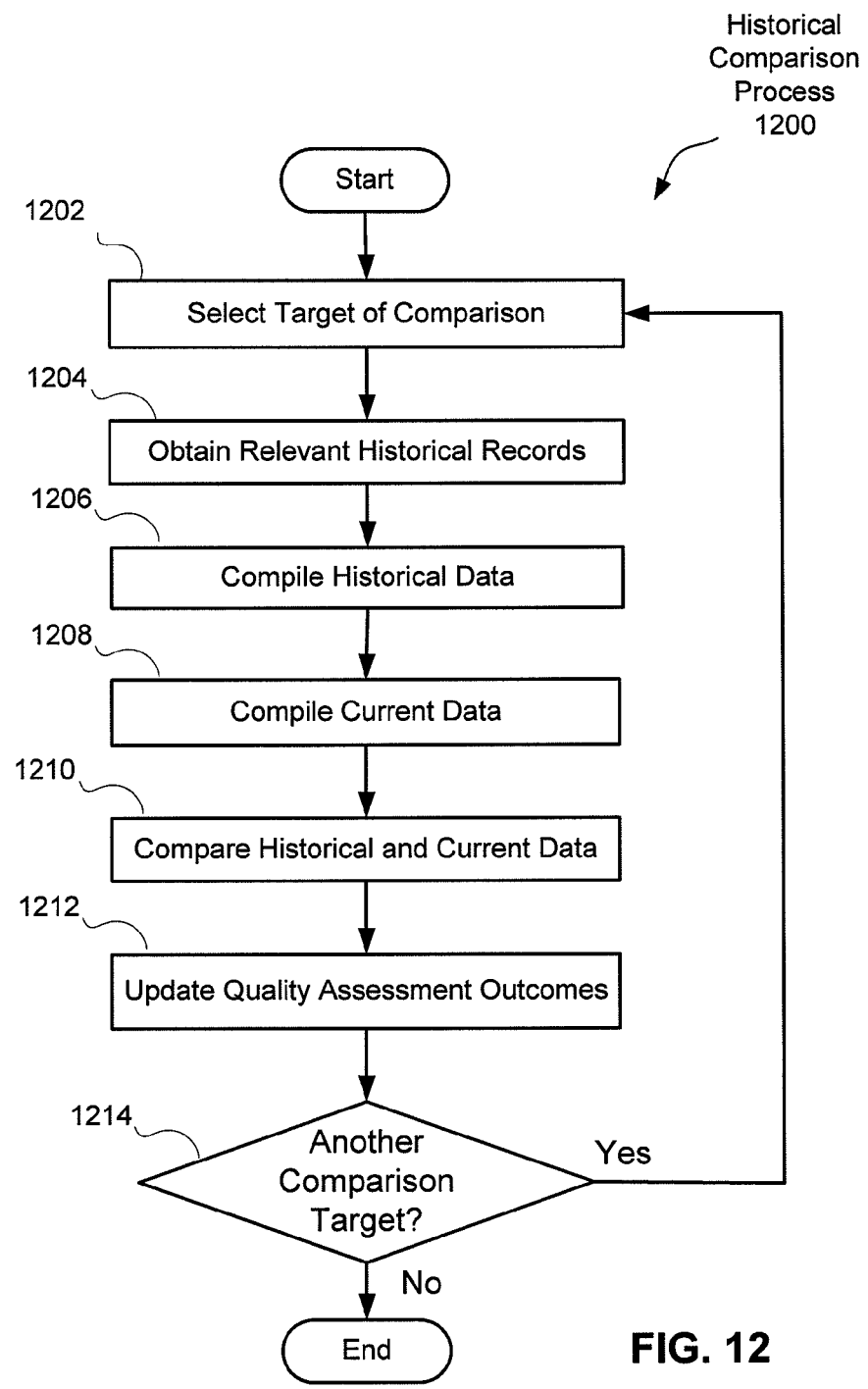
FIG. 12 illustrates a process for aggregating information regarding historical locate and/or marking operations and comparing the aggregated information with information regarding a current locate and/or marking operation, in accordance with some embodiments of the present disclosure.

In some embodiments, the automated quality assessment application may compare information pertaining to the current locate and/or marking operation against information pertaining to one or more historical locate and/or marking operations (i.e., previously completed locate and/or marking operations). FIG. 12 shows an example of a high-level process 1200 that may be performed by an automated quality assessment application to aggregate one or more pieces of information regarding historical locate and/or marking operations and to compare the aggregated information with information regarding the current locate and/or marking operation.

At act 1202, a target of comparison may be selected that focuses on one or more desired aspects of a current locate and/or marking operation. Generally, the target of comparison selected may depend on the purpose of conducting the historical comparison. For example, when the historical comparison is conducted as part of a risk management process, it may be desirable to determine whether the types of facilities located/marked during the current locate and/or marking operation are consistent with the types of facilities located/marked during one or more historical locate and/or marking operations performed at the same work site; hence, in this example, the target of comparison is "facility type." Additionally, or alternatively, it may be desirable to determine whether the locations at which locate marks are placed during the current locate and/or marking operation are consistent with the locations at which locate marks were placed during the historical locate and/or marking operations; hence, in this example, the target of comparison is "facility location."

As another example, when the historical comparison is conducted as part of a personnel evaluation process, it may be desirable to determine whether the actions taken by a locate technician during the current locate and/or marking operation are consistent with those taken during one or more historical locate and/or marking operations of comparable scope and/or complexity level. In this case, a suitable target of comparison may be "technician action." It may also be desirable to determine whether the amount of time taken by the locate technician to locate and mark a particular facility type during the current locate and/or marking operation is roughly the same as the amount of time taken by another locate technician to perform a similar locate and/or marking operation. In this case, a suitable target of comparison may be "total duration" of the locate and/or marking operation or "per-facility duration" specific to each facility type marked.

Following below is a list of comparison targets that may be selected at act 1202 of FIG. 12. It should be appreciated that these specific examples are provided merely for purposes of illustration, and that the present disclosure is not limited in this regard.

Types of facilities located, marked, and/or cleared.
Types and/or amount of physical locate marks (e.g., paint, flag, wood stakes, and/or nylon whiskers).
Colors and/or brand of paint dispensed.
Sizes, shapes, locations, and/or layouts of locate marks.
Distances or offsets between locate marks and environmental landmarks.
Actions taken by locate technicians (e.g., based on events logged by a locate device, a marking device, a combined locate and marking device, and/or any other equipment used by the locate technician to perform the locate and/or marking operation).
Equipment used by locate technicians (e.g., locate equipment, marking equipment, and/or safety equipment).
Total duration of locate and/or marking operation.
Per-facility duration for locating and/or marking each facility type.
Per-task duration for completing each task within the locate and/or marking operation, such as locating, marking, and/or document preparation (e.g., completing a closed ticket report, either on paper or electronically).

At act 1204, relevant records pertaining to one or more historical locate and/or marking operations may be retrieved from a suitable data storage. In some embodiments, a search may be conducted to identify historical locate and/or marking operations that may be relevant for the comparison target chosen at act 1202. For example, a search may be performed to identify:

historical locate and/or marking operations performed at the same work site, or in some close proximity to the work site;
historical locate and/or marking operations performed by the same locate technician or the same group/unit of locate technicians;
historical locate and/or marking operations with similar scope and/or complexity level; and/or
historical locate and/or marking operations performed under similar environmental conditions (e.g., day light, temperature, and/or humidity).

For instance, to identify historical locate and/or marking operations performed at or near the same work site, a search may be performed based on coordinates for one or more dig area indicators that are used to indicate or delimit a dig area on a VWL image (e.g., as shown in FIGS. 7 and 8). In some embodiments, the dig area indicator coordinates may identify a plurality of points along a perimeter of the delimited dig area, and the search may filter out any locate and/or historical marking operations performed entirely outside of the delimited dig area. In some further embodiments, the dig area indicator coordinates may identify a single point, in which case the search may filter out any locate and/or marking operations performed sufficiently far away from the identified point (e.g., with a distance greater than some suitably selected radius).

At act 1206, historical data relevant to the target of comparison selected at act 1202 may be compiled by extracting information from the historical records retrieved at act 1204 and/or aggregating the extracted information.

Various methods of aggregation may be used at act 1206, as the present disclosure is not limited in this regard. For example, when numerical data of a similar kind is extracted from multiple records, an average value (e.g., mean, median or mode) may be computed across the multiple records. Any other suitable statistics, such as standard deviation and/or variance, may also be computed, which may provide meaningful ranges against which a corresponding value from the current locate and/or marking operation may be measured. Similarly, for non-numerical data, a frequency analysis maybe performed to identify a set of one or more frequently occurring values against which a corresponding value from the current locate and/or marking operation may be compared. In the case of coordinate data corresponding to a plurality of geographical points, for example, a clustering of points may be detected and an acceptance zone may be determined based on any suitable characteristics of the detected cluster of points.

In some embodiments, at least some of the historical data retrieved at act 1204 may be associated with different levels of confidence. For example, historical data that is perceived to be more accurate/reliable may be associated with a higher level of confidence compared to historical data that is perceived to be less accurate/reliable. The levels of confidence may be adjusted as more records of historical locate and/or marking operations accumulate over time, providing better (e.g., independently verified) information regarding various aspects of locate and/or marking operations (e.g., the types, locations, layouts and/or other attributes of underground facilities at certain known work sites, and/or relative efficiencies of locate technicians). For instance, the level of confidence may be increased when consistent data is being observed, and vice versa.

In some embodiments, the associated levels of confidence may be used at act 1206 to resolve any conflicts in the historical data. For example, a piece of historical data with the highest confidence lever among similar pieces of historical data may be used for comparison with corresponding data from the current locate and/or marking operation.

Continuing to act 1208, current data (i.e., data regarding the current locate and/or marking operation) may be compiled using any relevant information retrieved from various information sources, such as those described above in connections with FIGS. 6-11 and Tables 1-6.

At act 1210, the current data compiled at act 1208 is compared against the historical data compiled at act 1206 according to the comparison target selected at act 1202. Any suitable method of comparison may be used, as the present disclosure is not limited in this respect.

In some embodiments, the types of facilities indicated as being located (respectively, marked or cleared) in the current data may be compared with the types of facilities indicated as being located (respectively, marked or cleared) in the historical data to identify any inconsistencies. Additionally, or alternatively, locate mark information from the current data may be compared against locate mark information from the historical data to determine whether locate marks dispensed during the current locate and/or marking operation are sufficiently close to locate marks placed during the historical locate and/or marking operations. For instance, this may be done by determining whether data points in the current locate mark information are within a "threshold distance" of one or more data points associated with the historical locate mark information. A more detailed example of location-based comparison is described further below in connection with FIGS. 13 and 14.

As another example, the actions taken by a locate technician may be compared with actions taken during one or more historical locate and/or marking operations of comparable scope and/or complexity level. For instance, the type(s) of marking material used in the current location operation may be compared with the type(s) of marking material used in the historical locate and/or marking operations to identify any inconsistencies.

As yet another example, it may be determined whether the amount of time taken by the locate technician to locate and mark a particular facility type during the current locate and/or marking operation is within some acceptable range associated with the historical data (e.g., a range determined based on an average, standard deviation and/or variance derived from time information relating to the historical locate and/or marking operations.)

At act 1212, one or more results of the comparison carried out at act 1210 are used to assign and/or update an automated assessment outcome in a suitable manner. In some embodiments involving numerical data, suitable thresholds and/or ranges may be selected, and a result of comparison may be measured against the selected thresholds and/or ranges to categorize the current locate and/or marking operation, for example, into one of the categories "APPROVED," "SATISFACTORY," "UNSATISFACTORY," and "PROMPT," as shown in FIG. 5. The thresholds and/or ranges may be chosen in any suitable manner, as the present disclosure is not limited in this regard. For example, the thresholds and/or ranges may be chosen based on human input, which may or may not be informed by various statistics regarding historical locate and/or marking operations.

More generally, one or more comparison criteria may be defined and applied to the historical and current data obtained at acts 1206 and 1208. The comparison criteria may comprise one or more rules specifying: (1) one or more conditions regarding the historical and/or current data, and (2) for each condition regarding the historical and/or current data, an action to be taken when the condition is satisfied by the historical and/or current data. Examples of actions include, but are not limited to, assigning the current locate and/or marking operation to one of a plurality of pre-defined categories, adjusting a quality score of the current locate and/or marking operation, and/or performing one or more additional comparisons.

In some illustrative implementations, scoring adjustment may be weighted according to a number of different factors. For example, some aspects of the current locate and/or marking operation may be deemed more or less critical compared to other aspects of the current locate and/or marking operation. Accordingly, heavier or lighter weights may be used when adjusting a quality score based on a comparison relating to those aspects. As a more specific example, a discrepancy in the types of facilities located may be deemed more significant than a discrepancy in the precise locations at which locate marks are placed, and therefore the former may lead to more significant changes in the quality score. Additionally, or alternatively, scoring adjustment may be weighted according to a degree of discrepancy between the historical and current data. For example, a suitable scale (which may or may not be continuous) may be selected to convert a degree of discrepancy into a corresponding scoring adjustment.

In some further embodiments, some or all of the comparison criteria may be parameterized by contextual information available in the historical and/or current records. For instance, when comparing a locate technician's performance efficiency (e.g., in terms of time spent per unit of work), environmental conditions such as day light and temperature may be taken into account. As a more specific example, an exceptionally long duration may not count against the quality score when it coincides with adverse weather conditions such as extreme heat or cold.

Proceeding to act 1214, it is determined whether another type of comparison is to be targeted. If it is determined that another comparison target is desired, the process 1200 returns to act 1202 to select a new comparison target. A new comparison target may, in some instances, be the same as the previous comparison target. For example, if the comparison results from act 1210 are unsatisfactory or inconclusive, it may be desirable to repeat the comparison with modified parameters. As a more concrete example, a locate-based comparison may be repeated one or more times with different sets of representative data points (e.g., larger sets of data points) to obtain a more refined result.

If it is determined at act 1214 that no other comparison targets are desired, the process 1200 may end. Alternatively, prior to ending the process 1200, it may be determined whether one or more records pertaining to the current locate and/or marking operation are to be added to an archive of historical tickets. The records may contain any information that is already available regarding the current locate and/or marking operation, as well as some or all of the quality assessment outcomes obtained at act 1212. In this manner, the current locate and/or marking operation may be taken into account when assessing the quality of future locate and/or marking operations.

Figure 13:
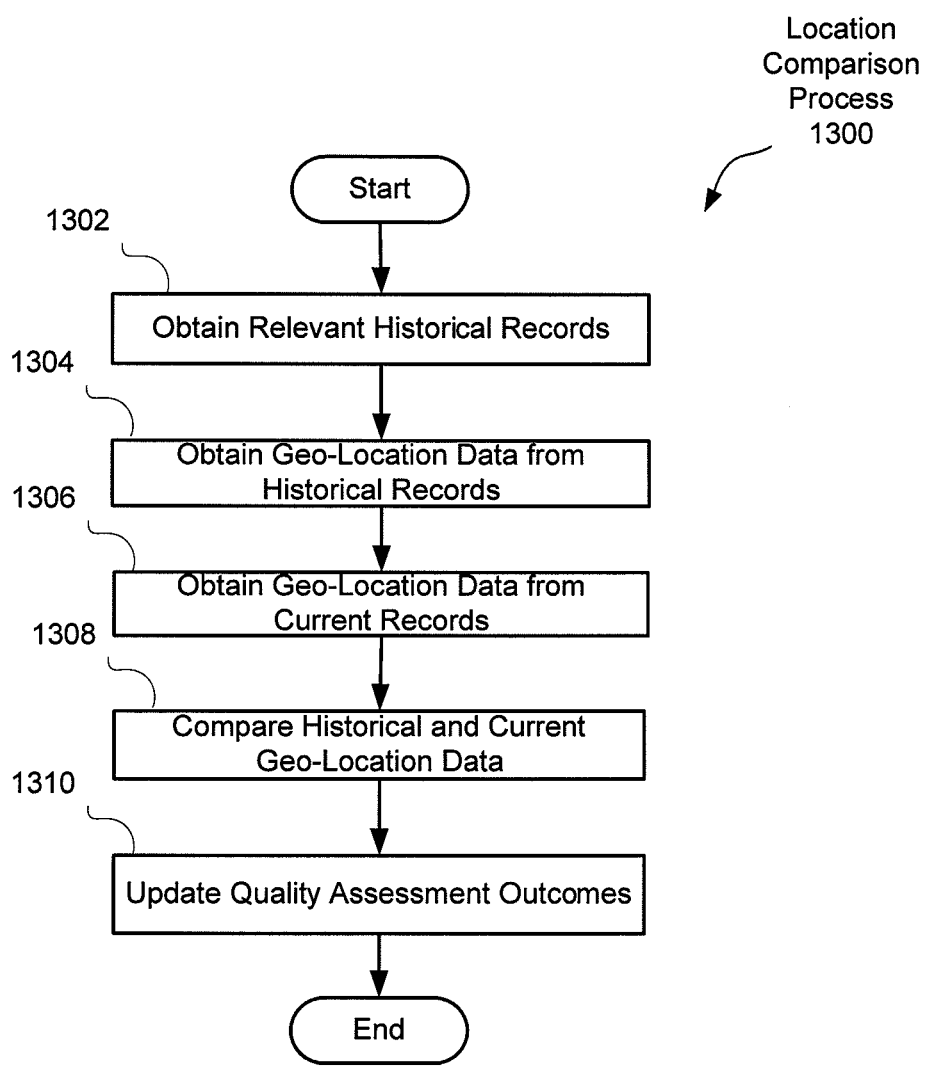
FIG. 13 illustrates a process for carrying out a location-based comparison, in accordance with some embodiments of the present disclosure.

FIG. 13 shows an example of a process 1300 that may be performed to carry out a location-based comparison. For example, the process 1300 may be performed as part of the historical comparison process 1200 shown in FIG. 2 when a comparison target selected at act 1202 is the location(s) at which a certain type of facility is marked at a certain work site. The comparison may be based on an absolute frame of reference (e.g., using GPS coordinates from both the historical data and the current data). Alternatively, the comparison may be based on a relative frame of reference (e.g., the comparison may be based on offsets from one or more fixed points of reference, such as one or more environmental landmarks). Any combination of these and other comparison techniques may be used, as the present disclosure is not limited in this respect.

The illustrative process 1300 begins at act 1302 by obtaining one or more relevant historical records. In this example, a search may be performed to identify historical locate and/or marking operations performed at or near the same work site of the current locate and/or marking operation. The search may be based on property address, page and/or grid numbers on a standard map, GPS coordinates, and/or any other suitable types of location data.

At act 1304, geo-location data (e.g., coordinates for a set of data points) may be obtained based on location information in the historical data. The geo-location data may be representative of the locations at which locate marks were placed during the historical locate and/or marking operations, for example, as indicated by historical marking device data such as the data sets shown in Table 2 above. In some embodiments, the geo-location data may not include the coordinates of all relevant data points found in the historical marking device data. Rather, the geo-location data may include a set of coordinates that are representative of the historical marking device data in some suitable manner. For example, coordinates may be taken along a line pattern (e.g., the line pattern 1100 shown in FIG. 11) at some suitable intervals so as to reduce the number of representative data points without significantly sacrificing accuracy.

In some instances, location information extracted from the historical data may need to be transformed in some appropriate fashion to facilitate meaningful comparisons. For example, GPS coordinates may be transformed into map coordinates, or vice versa, according to some suitable map projection. As another example, absolute location information (e.g., GPS coordinates) may be transformed into relative location information (e.g., distance and/or directional offsets from one or more fixed reference points), or vice versa. Other types of transformations may also be suitable.

Proceeding to act 1306, geo-location data may be obtained based on location information in one or more records pertaining to the current locate and/or marking operation. Similar to the historical geo-location data, current geo-location data may be chosen to be representative of the locations at which locate marks were placed during the current locate and/or marking operation. Also, when appropriate, one or more transformation techniques as described above may be applied to some or all of the current geo-location data.

At act 1308, the current geo-location data may be compared in some suitable manner against the historical geo-location data. For example, when the historical and current geo-location data each includes a set of points indicated by coordinates in a common coordinate system (e.g., as a result of one or more transformations performed at act 1304 and/or 1306), a measure of distance may be obtained between the two sets of points.

In some implementations, a distance between two sets of points, X and Y, may be measured by determining the smallest distance between any point from the first set and any point from the second set. In some other implementations, a distance from a set X to a set Y may be a vector d of distance measurements indexed by the points in X. Further details regarding this latter example are described below in connection with FIG. 14.

At act 1310, one or more results of the comparison carried out at act 1308 may be used to assign and/or update one or more assessment outcomes of the current locate and/or marking operation. As discussed above in connection with act 1212 of FIG. 12, a result of comparison may be measured against selected thresholds and/or ranges to categorize the current locate and/or marking operation or otherwise assign a score or grade to the current locate and/or marking operation. In a more specific example, where a distance from a first set of points, X, to a second set of points, Y, is expressed as a vector d of distance measurements indexed by the points in X, a comparison criterion may be defined based on a percentage of points in X having distance measurements falling within some suitable ranges (e.g., within 12 to 18 inches). Further examples of suitable comparison and/or assessment criteria are discussed below in connection with Tables 8 and 9.

Figure 14:
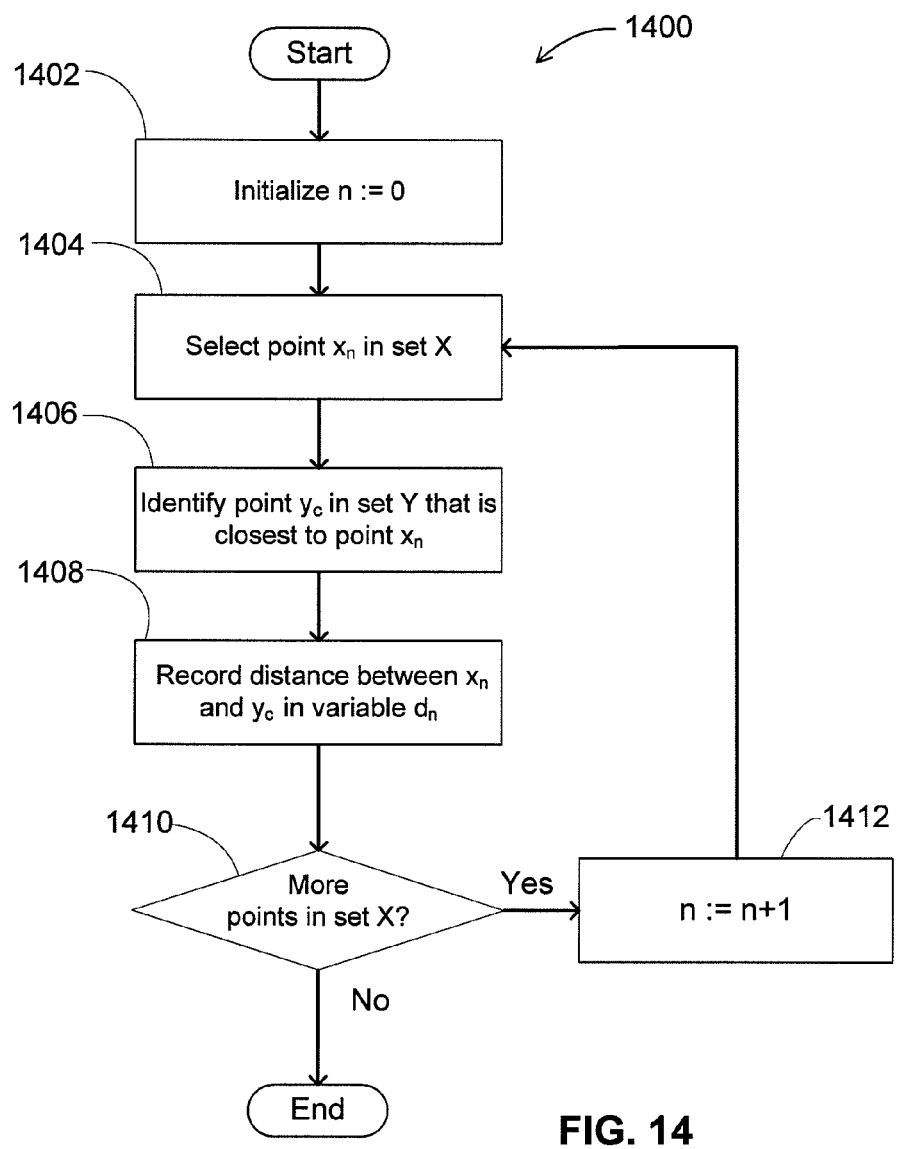
FIG. 14 illustrates a process for determining a distance between two sets of geographical points, in accordance with some embodiments of the present disclosure.

Turning now to FIG. 14, an example of a process 1400 is presented that may be used to determine a distance from a first set of points, X, to a second set of points, Y. As discussed above in connection with FIGS. 12 and 13, the points in the set X may be represented by multiple pieces of geo-location data (e.g., GPS coordinates), and may correspond to one or more actuations of a marking device during a current locate and/or marking operation, as discussed above in connection with FIG. 11 and Table 2. Similarly, the points in the set Y may also be represented by multiple pieces of geo-location data (e.g., GPS coordinates), and may correspond to one or more actuations of a marking device during one or more historical locate and/or marking operations.

It should be appreciated that the geo-location data representing the points in the sets X and Y may be obtained or derived from field data collected using any suitable equipment, including, but not limited to, a locate device, a marking device and/or a combined locate and marking device (e.g., as shown in Table 1, 2, 4 and 5 above).

Furthermore, the locate and/or marking operations (e.g., current and historical) corresponding respectively to the sets X and Y may be conducted at the same work site at different times, so that a distance from X to Y may indicate whether the locate and/or marking operations produced consistent results. For example, a distance from the set X to the set Y may indicate whether a technician conducting a current locate and/or marking operation placed locate marks at roughly the same locations as did a technician conducting a historical locate and/or marking operation.

Referring to FIG. 14, the illustrative process 1400 begins at act 1402 by initializing a variable n to zero, where n serves as an index for the points in the set X. The process 1400 continues to act 1404, where a point $x_n$ in the set X is selected. The process 1400 next continues to act 1406, where a point in set Y that is closest to the point $x_n$ is identified and is stored in a variable $y_c$. That is, among all the points in the set Y, the selected point $y_c$ has the smallest distance from the point $x_n$. The process 1400 then continues to act 1408, where a distance between $x_n$ and $y_c$ is recorded and stored in the variable $d_n$. The process next continues to act 1410, where it is determined whether there are any more points in the set X to process. When it is determined that the set X contains one or more points yet to be processed, the process 1400 continues to act 1412, where the value of n is incremented by one. The process then returns to act 1404 to select a next point in the set X. If, on the other hand, it is determined at act 1410 that there are no more points in the set X to process, the process 1400 ends.

It should be appreciated that each of the sets X and Y may include any number of points, as the present disclosure is not limited in this respect. For example, in some embodiments, one or both of the sets may have only one geo-location point specifying a single point on Earth. In other embodiments, one or both sets may have multiple geo-location points specifying multiple points on Earth.

Additionally, the process 1400 may be applied to determine a measure of distance between any two sets of points in any space in which a measure of distance can be defined between two points. Thus, the application of the process 1400 is not limited to geo-location data expressed in an absolute frame of reference that ties the geo-location data to specific points on Earth. For example, in some embodiments, the geo-location points in set X and Y may not be expressed in latitude and longitude. Rather they may be expressed as locations (e.g., distance and/or direction) relative to some other reference point (e.g., an arbitrary reference point, a reference point defined by one or more facilities maps, and/or a reference point defined by some environmental landmark). In some further embodiments, the process 1400 may even be applied to determine a measure of distance between two sets of points expressed in terms of display coordinates for some field of display (e.g., a computer screen).

The process 1400 is also not limited to any particular technique for determining the distance between two points, as any of numerous techniques may be used. For example, in an embodiment where the geo-location data is expressed in latitudinal and longitudinal coordinates, a distance between two points may be calculated according to the great-circle distance in spherical geometry, using Vincenty's inverse method for computing geographical distance between two points, and/or using some other suitable method. In some embodiments in which the coordinates for the two points are each two-dimensional Cartesian coordinates in a common grid system, the straight line distance between these two points may be determined using the following formula: $d=sqrt((x_2-x_1)^2+(y_2-y_1)^2)$.

In embodiments in which the process 1400 is used to perform the comparison in act 1308 in FIG. 13, in some exemplary implementations the quality assessment update in the following act 1310 of FIG. 13 may be based on the percentage of distance values in the distance vector $d=[d_0 \ldots d_n]$ that are within some predetermined range or threshold.

Table 8 below shows one possible technique for generating a quality assessment of a locate and/or marking operation in this way using a scoring table. Techniques for generating a scoring table and computing a score using a scoring table are described in greater detail in U.S. Non-provisional patent application Ser. No. 12/493,109, filed Jun. 26, 2009, entitled "Methods and Apparatus for Quality Assessment of a Field Service Operation," incorporated by reference herein. As shown in Table 8, the criterion on which the quality of locate and/or marking operation is being assessed is listed in the leftmost column. For this criterion, the table includes one or more expected or reference values or ranges for the criterion, also referred to as "metrics," against which information about the locate and/or marking operation is measured/compared. The metrics are divided into several "scoring categories," namely, value(s)/condition(s) that, if met, result in a particular score.

For purposes of the analysis illustrated in Table 8, field information/data is referred to as ACTUAL DATA, and reference information/data is referred to as EXPECT DATA. A quality assessment for the indicated criterion is based on a comparison of the ACTUAL DATA to the EXPECT DATA (e.g., so as to determine in what scoring category the ACTUAL DATA falls as a result of the comparison). For purposes of the discussion that follows, although examples based on numeric scores are provided, the term "score" as used herein is intended to more generally denote any of a variety of graduated indicators for a quality assessment (which in turn may be based on a variety of ranges, scales and resolutions/granularity for the indicators).

TABLE 8

| Criterion | Expected value or range (metrics) | | |
| --- | --- | --- | --- |
| | Preferred | Marginal | Unacceptable |
| EXP: Percentage of points in distance vector within threshold distance | 75% of more of points are within 1 foot. | Less than 75% of points are within 1 foot, but 50% or more of points are within 2 feet. | 50% or more of points are outside 2 foot. |
| ACT: Percentage of points in distance vector within threshold distance | 90% of points are within 1 foot. | | |

In the example of Table 8, the criterion on which the quality of the locate operation is being assessed is the percentage of points at which locate marks were placed that are within some threshold distance of the closest corresponding point in the historical data. Additionally, in this example, there are three scoring categories: Preferred; Marginal; and Unacceptable. For each scoring category, there is a metric used to evaluate the contents of the distance vector $d=[d_0 \ldots d_n]$ resulting from the comparison of the field data and the reference data to determine in which scoring category the results of the comparison fall. In the example of Table 8, an evaluation of the distance vector shows that 90% of the points at which locate marks were placed were within one feet of the corresponding closest point in the historical data. As such, the locate and/or marking operation falls into the preferred category.

With reference again to act 306 of FIG. 3 (or, similarly, act 506 of FIG. 5), in some embodiments a score, grade, or categorization may be assigned as an output to categorize the quality assessment process based on into which scoring category the assessment falls. For example, in some embodiments, each scoring category may be associated with a number of points (e.g., 2 points for Preferred, 1 point for Marginal, and 0 points for Unacceptable), and the quality assessment may be awarded the number of points associated with the scoring category into which it falls. Thus, for example, in the example of Table 8, 2 points may be awarded, because the operation falls in the "Preferred" scoring category.

In some embodiments, the number of points awarded may be converted to a percent score that is based on the number of points awarded and a maximum possible number of points. Thus, for example, in the example of Table 8, the locate and/or marking operation received two points out of a maximum possible two points. As such, the locate and/or marking operation may be assigned a score of 2/2 or 100%. If the assessment results were to fall in the "Marginal" category and receive only one point, then it may be assigned a score of 1/2 or 50%. Similarly, if the assessment results were to fall in the unacceptable category and receive zero points, then it may be assigned a score of 0/2 or 0%.

In some embodiments, a range of percent scores may be converted to letter scores to provide an indication of quality. For example, a percent score of 100-90% may be converted to a letter score of A, 89-80% may be converted to a letter score of B, 79-70% may be converted to a letter score of C, 69-60% may be converted to a letter score of D, and <60% may be converted to a letter score of F. In yet another example, a range of percent scores may be converted to a simple PASS/FAIL score. For example, a percent score of 100-60% may be converted to a score of PASS and a percent score of <60% may be converted to a score of FAIL.

In some embodiments, the quality assessment illustrated in Table 8 may be used in the process of FIG. 5 to categorize the locate and/or marking operation as either "Approved," "Coach" or "QC Referral. For example, Table 8 may be used at act 504 to assess the quality of the locate and/or marking operation. Based on this assessment, the quality of the operation may be categorized at act 506. For example, if the operation falls in the "Preferred" scoring category in Table 8 it may be categorized as "Approved" at act 506; if the operation falls in the "Marginal" scoring category, it may be categorized as "Coach;" and if the operation falls in the "Unacceptable" scoring category it may be categorized as "QC Referral."

In the example of Table 8, three scoring categories are used, such that the locate and/or marking operation is classified as either Preferred, Marginal, and Unacceptable. However, the number of scoring categories is merely illustrative, as any number of scoring categories could be used, and various mutually exclusive metrics may be assigned to these scoring categories. For example, in some embodiments, five scoring may be used (e.g., Excellent, Good, Average, Poor, Unacceptable), while in other embodiments more than five scoring categories may be used.

In addition, it should be appreciated that the percentage values and distance threshold values used in the metrics in Table 8 (and in Tables 9 and 10 described below) are merely illustrative and that a variety of different percentage values and distance threshold values may be used. In some embodiments, the distance threshold values may be based on legal requirements pertaining to locate and/or marking operations. For example, some governments (e.g., state governments) may dictate that a locate mark placed on the ground is within a certain "tolerance zone" around the underground facility (e.g., 12 inches, 18 inches, 24 inches, 30 inches, 36 inches, etc.). Thus, in some embodiments, one or more of the metrics used in a scoring table may be based on a tolerance zone dictated by government regulations.

In the example provided by Table 8, a single criterion is provided for all of the facility lines marked. However, in some embodiments, a separate criterion may be used for each facility line marked. For example, as shown in Table 9 below, if during a locate and/or marking operation, a gas line, a power line, and a water line were marked, then a separate criterion may be provided for each of these facility lines. This enables the accuracy of each facility line that was marked during the locate and/or marking operation to be assessed independent of the other facility lines.

TABLE 9

| Criterion | Expected value or range (metrics) | | |
|---|---|---|---|
| | Preferred | Marginal | Unacceptable |
| EXP: Type = Gas; Percentage of points within threshold distance of any facility line point (as indicated in historical reference data) | 95% or more of points are within 1 foot. | Less than 95% of points are within 1 foot, but 50% or more of points are within 2 feet. | 50% or more of points are outside 2 feet. |
| ACT: Type = Gas; Percentage of points within threshold distance of any facility line point (as indicated in historical reference data) | 98% of points are within 1 foot. | | |
| EXP: Type = Electric; Percentage of points within threshold distance of any facility line point (as indicated in historical reference data) | 95% or more of points are within 1 foot. | Less than 95% of points are within 1 foot, but 50% or more of points are within 2 feet. | 50% or more of points are outside 2 feet. |
| ACT: Type = Electric; Percentage of points within threshold distance of any facility line point (as indicated in historical reference data) | | 10% of points are outside of 1 foot, but 75% of points are within 2 feet. | |
| EXP: Type = Water; Percentage of points within threshold distance of any facility line point (as indicated in historical reference data) | 95% or more of points are within 1 foot. | Less than 95% of points are within 1 foot, but 50% or more of points are within 2 feet. | 50% or more of points are outside 2 feet. |
| ACT: Type = Water; Percentage of points within threshold distance of any facility line point (as indicated in historical reference data) | | | 80% of points are outside 1 foot. |

As discussed above, in some embodiments, each scoring category may be associated with a number of points (e.g., 2 points for Preferred, 1 point for Marginal, and 0 points for Unacceptable), and the quality assessment may be awarded the number of points associated with the scoring category into which it falls. Thus, for example, in the example of Table 9, 2 points may be awarded for marking of the gas line(s), 1 point may be awarded for the marking of the electric line(s), and 0 points may be awarded for the marking of the water line(s). Thus, the operation may receive a score of three points out of a maximum possible total of six points, for a score of 3/6 or 50%.

In the example provided by Table 8 for generating a quality assessment of the locate and marking operation, the sole criterion for assessing quality is based on a comparison of the location of locate marks placed during a locate operation and the location of locate marks placed during one or more historical locate operations. However, the invention is not limited in this respect, as in some embodiments, this criterion may be one of a number of criteria that is used at act 1310 of FIG. 13 (or act 506 of FIG. 5) to generate/update a quality assessment. There are variety of techniques by which this criterion may be used in combination with other criteria to generate a quality assessment, one example of which is provided below. However, the invention is not limited to using the particular technique described below or any other particular technique.

In some embodiments, a scoring table, similar to Table 8 may be used to assess the quality of a locate and/or marking operation based on a plurality of different criteria. An example of such a scoring table is shown below in Table 10. Table 10 is similar to Table 8, except that instead of a single criterion in the left-most column, there are multiple criteria. In addition, in Table 10, each criterion may be assigned a weight factor, such that some criteria (e.g., criteria that are deemed more important) may optionally be given greater weight than others in the quality assessment. As with Table 8, for each criterion in Table 10, actual data (field data) obtained from the locate and/or marking operation being evaluated may be compared with expected data (reference data) values or ranges for that criterion, and a number of points may be awarded based on the scoring category into which the locate and/or marking operation falls for that criterion and a weight factor assigned to that scoring category. For example, if the weight factor for a particular criterion is 5 and the locate and/or marking operation falls into the "Preferred" category for that criterion, then 10 points (i.e. 2×5) would be awarded for that criterion based on the example given above in connection with Table 8.

TABLE 10

| Criterion | Preferred (score = 2) | Marginal (score = 1) | Unacceptable (score = 0) | Weight Factor | Weighted Score |
|---|---|---|---|---|---|
| EXP: Percentage of points in distance vector within threshold distance | 75% or more of points are within 5 feet. | Less than 75% of points are within 5 feet, but 50% or more of points are within 10 feet. | 50% or more of points are outside 10 feet. | — | — |
| ACT: Percentage of points in distance vector within threshold distance | 90% of points are within 5 feet. | | | x1 | 2 |
| EXP: Dig area geo-location | N35°43.57518, W078°49.78314 ≤0.2 miles | N35°43.57518, W078°49.78314 >0.2 to ≤0.5 miles | N35°43.57518, W078°49.78314 >0.5 miles | — | — |
| ACT: Geo-location data | N35°43.57518, W078°49.78314 ± 0.04 mi | | | P/F | P |
| EXP: Locate Date | Before 05FEB2009 | On 05FEB2009 | After 05FEB2009 | — | — |
| ACT: Timestamp data | 04 05FEB2009; 09:35:15.2 | | | x2 | 4 |
| EXP: Elapsed time | 40 mins | 40 mins ± 10-20 mins | 40 mins ± >20 mins | — | — |
| ACT: Timestamp data | 54 mins | | | x2 | 2 |
| EXP: Type = Electric power | RED color data present | n/a | RED color data absent | — | — |
| ACT: Color data | RED present | | | x5 | 10 |
| EXP: Geo-location | N35°43.57518, W078°49.78314 ± 0 to 0.1 mi | N35°43.57518, W078°49.78314 ± >0.1 to <0.2 mi | N35°43.57518, W078°49.78314 ± >0.2 mi | — | — |
| ACT: Geo-location data | N35°43.57518, W078°49.78314 ± 0.04 mi | | | x2 | 4 |
| EXP: Gain | 0-45 | >45-70 | >70-100 | — | — |
| ACT: Gain | 35 | | | x1 | 2 |
| EXP: Sig. strength | 100-85% | <85-65% | <65% | — | — |
| ACT: Signal data | 83% | | | x1 | 1 |
| EXP: Type = Gas, oil | YELLOW color data absent | n/a | YELLOW color data present | — | — |
| ACT: Color data | YELLOW absent | | | x5 | 10 |
| EXP: Type = Com, CATV | ORANGE color data absent | n/a | ORANGE color data present | — | — |
| ACT: Color data | ORANGE absent | | | x5 | 10 |
| EXP: Type = Water | BLUE color data present | n/a | BLUE color data absent | — | — |
| ACT: Color data | BLUE present | | | x5 | 10 |
| EXP: Geo-location | N35°43.57518, W078°49.78314 ± 0 to 0.1 mi | N35°43.57518, W078°49.78314 ± >0.1 to <0.2 mi | N35°43.57518, W078°49.78314 ± >0.2 mi | — | — |
| ACT: Geo-location data | | N35°43.57518, W078°49.78314 ± 0.14 mi | | x2 | 2 |
| EXP: Gain | 0-45 | >45-70 | >70-100 | — | — |
| ACT: Gain | 35 | | | x1 | 2 |
| EXP: Sig. strength | 100-85% | <85-65% | <65% | — | — |
| ACT: Signal data | 87% | | | x1 | 2 |
| EXP: Type = Sewer | GREEN color data absent | n/a | GREEN color data present | — | — |
| ACT: Color data | GREEN absent | | | x5 | 10 |
| EXP: Type = Irrigation | PURPLE color data absent | n/a | PURPLE color data present | — | — |
| ACT: Color data | PURPLE absent | | | x5 | 10 |
| EXP: Locate technician ID | Lookup table | n/a | Not found | — | — |
| ACT: Locate technician ID | 4815 | | | P/F | P |
| EXP: Marking Device ID | Lookup table | n/a | Not found | — | — |
| ACT: Marking Device ID | 7362 | | | P/F | P |
| EXP: Locate Device ID | Lookup table | n/a | Not found | — | — |
| ACT: Locate Device ID | 7345 | | | P/F | P |
| EXP: Temp (° F.) | 50-80 | 20-<50, >80-110 | <20, >110 | — | — |
| ACT: Temp data | 73 F. | | | x2 | 4 |
| EXP: Humidity | 0-40% | >40-90% | >90-100% | — | — |
| ACT: Humidity data | 52% | | | x2 | 2 |
| EXP: Light | 4.0 to 5.0 volts | 2.0 to <4.0 volts | <2.0 volts | — | — |
| ACT: Light data | 4.3 volts | | | x2 | 4 |
| EXP: Inclinometer | −30 to 30 degrees | <−30 to −60 degrees or >30 to 60 degrees | <−60 to −90 degrees or >60 to 90 degrees | — | — |

TABLE 10-continued

| Criterion | Preferred (score = 2) | Marginal (score = 1) | Unacceptable (score = 0) | Weight Factor | Weighted Score |
|---|---|---|---|---|---|
| ACT: Inclinometer data | −17 | | | x1 | 2 |
| EXP: Accelerometer data | 0.2 g to 1.0 g | >1.0 g to 1.5 g | >1-5 g | — | — |
| ACT: | 0.375 g | | | x1 | 2 |
| EXP: Battery strength data | 100-85% | <85-50% | <50% | — | — |
| ACT: Battery strength data | 93% | | | x5 | 10 |
| | | Total points earned out of a possible 112 = | | | 105 |
| | | Percent Score = | | | 93.8% |

Once the number of points awarded for each criterion has been determined, a total number of points may be computed by summing together the points awarded for each of the criteria together. The maximum number of points possible for the locate and/or marking operation may be determined by first determining the sum of all weight factors and then multiplying this sum by the point value of the "Preferred" result. A percentage score may be determined by dividing the number of points awarded by the maximum number of points possible and multiplying the result by 100.

For example and referring to Table 10, the sum of the weight factors is 56 and the point value of the "Preferred" result is 2. Therefore, in this example the maximum number of points possible for the locate operation is 56×2, which is 112. The sum of the points earned for the current locate operation, in the example of Table 10, is 105. Thus, the percent score for the current locate operation, which in this example is 105/112×100=93.8%.

As discussed above, a range of percent scores may be converted to letter scores, so that a letter score letter score indicative of the quality of the locate and/or marking operation may be assigned. For example, a percent score of 100-90% may be converted to a letter score of A, 89-80% may be converted to a letter score of B, 79-70% may be converted to a letter score of C, 69-60% may be converted to a letter score of D, and <60% may be converted to a letter score of F. In yet another example, a range of percent scores may be converted to a simple PASS/FAIL score. For example, a percent score of 100-60% may be converted to a score of PASS and a percent score of <60% may be converted to a score of FAIL.

In other embodiments, the numerical quality assessment score may be used to automatically categorize a locate operation as either APPROVED, COACH, or QC Referral. In one example, using the numeric scoring system of 0 to 100%, a score of 60% or below may automatically render an assessment of QC Referral, in which case, after act 506 of FIG. 5, the process continues to act 510. A score of >60% to 80% may automatically render an assessment of COACH, in which case the process continues to act 508, and a score of >80% to 100% may automatically render an assessment of APPROVED.

The example of Table 10 shows a scoring table have a number of various different criteria. The number of criteria and the particular criteria used are merely illustrative, as any number or type of criteria may be used. Thus, the constructs provided by Tables 8-10 above illustrate various concepts germane to assessing the quality of locate and/or marking operations based at least on reference information derived from historical information (e.g., historical tickets), which reference information may be used alone or in combination with other information that may provide for a variety of criteria by which such operations may be assessed.

IV. Visual Representations

Figure 15:
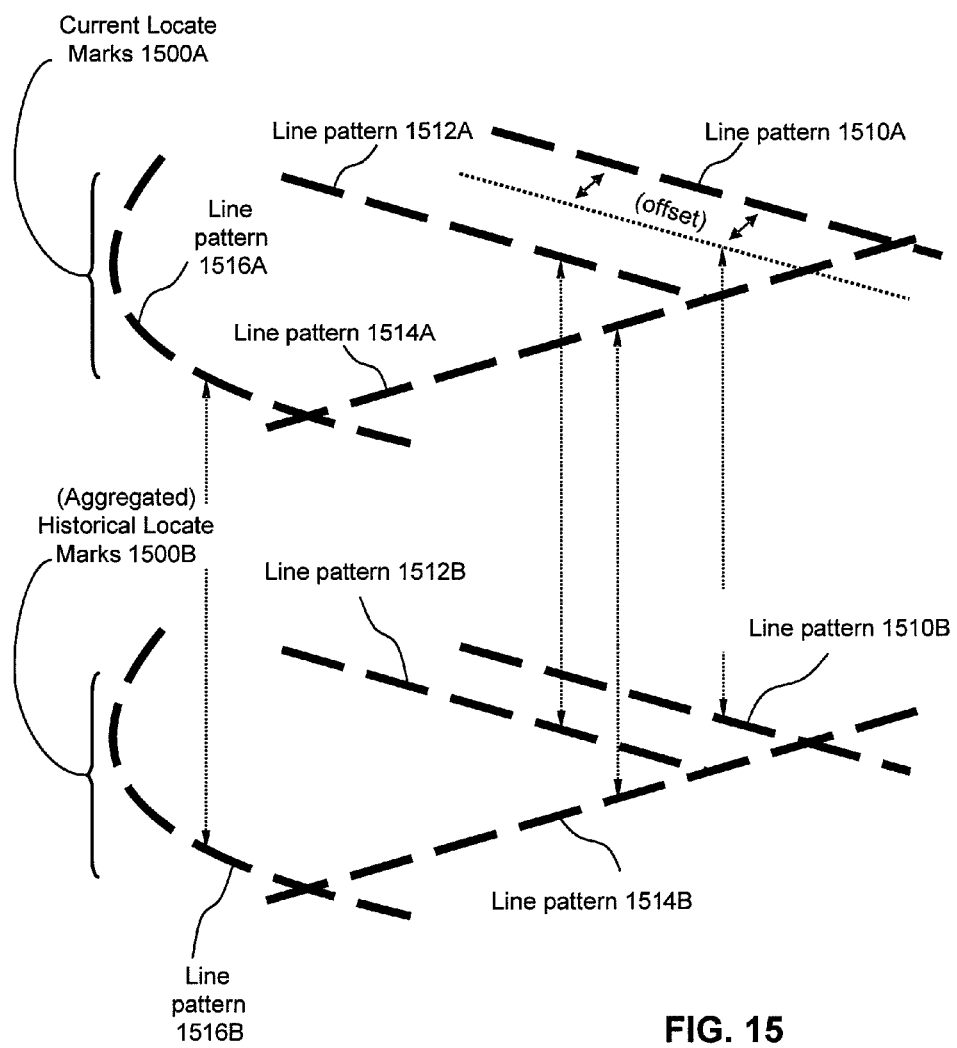
FIG. 15 illustrates a visual representation of locate marks placed during a current locate and/or marking operation, as well as locate marks rendered based on aggregated historical information, in accordance with some embodiments of the present disclosure.

In some embodiments, marking device data (e.g., as shown in Table 2 above) captured during a locate and/or marking operation may be used to create a visual representation of the locate marks placed (either physically or virtually) during the locate and/or marking operation. FIG. 15 shows an example of a visual representation of current locate marks 1500A (i.e., locate marks placed during a current locate and/or marking operation). This visual representation may be rendered using any software application capable of rendering one or more features at appropriate locations on a display device (e.g., a computer screen) according to associated location information (e.g., coordinates in some suitable coordinate system, such as GPS coordinates). For example, the visual representation may be rendered using the electronic manifest application 460 described above in connection with FIGS. 4 and 9.

As shown in FIG. 15, the current locate marks 1500A include line patterns 1510A, 1512A, 1514A and 1516A, each of which comprises a plurality of actuations. Although not shown, the actuations in the line patterns 1510A, 1512A, 1514A and 1516A may be associated with different paint colors indicating different facility types (e.g., as indicated in Table 3 above). Paint color information may be available in the marking device data captured during the current locate and/or marking operation (e.g., as shown in the "Product data" filed listed in Table 2 above).

FIG. 15 also shows line patterns 1510B, 1512B, 1514B and 1516B, which may be rendered based on geo-location data extracted and/or aggregated from one or more historical locate and/or marking operations. Although not required, the line patterns 1510B, 1512B, 1514B and 1516B may be rendered on a different plane compared to the line patterns 1510A, 1512A, 1514A and 1516A, but may be aligned according to the underlying geo-location data.

In some embodiments, all of the line patterns 1510B, 1512B, 1514B and 1516B may correspond to locate marks placed during a single historical locate and/or marking operation. Alternatively, at least some of the line patterns 1510B, 1512B, 1514B and 1516B may correspond to locate marks placed during different historical locate and/or marking operations. As yet another alternative, the aggregated geo-location data used to render the line patterns 1510B, 1512B, 1514B and 1516B may be obtained by averaging or otherwise transforming geo-location data extracted from the historical tickets. In other words, the line patterns 1510B, 1512B, 1514B and 1516B need not correspond exactly to locate marks placed during any historical locate and/or marking operation; rather, they may be some suitable representatives of those locate marks.

Visual representations such as those shown in FIG. 15 may be useful in visually illustrating possible discrepancies between the current and historical data. For example, the line patterns 1510A, 1512A, 1514A and 1516A may be correlated with the line patterns 1510B, 1512B, 1514B and 1516B according to paint color information. As a more specific example, a color associated with line pattern 1510A may be "red," indicating that line pattern 1510A corresponds to a power line. On the other hand, a color associated with line pattern 1510B may also be red, which may suggest that the line patterns 1510A and 1510B may correspond to the same power line, and that a comparison between the locations of the line patterns 1510A and 1510B may be appropriate (e.g., using a process similar to the process 1300 shown in FIG. 13). Similarly, using the associated paint color information, the line pattern 1512A may be correlated with the line pattern 1512B, the line pattern 1514A may be correlated with the line pattern 1514B, and the line pattern 1516A may be correlated with the line pattern 1516B.

As shown in FIG. 15, there may be a discrepancy in location between one of the pairs of correlated line patterns (e.g., the line patterns 1510A and 1510B). That is, the line patterns 1510A and 1510B may be offset from each other to some degree. This discrepancy may be automatically detected, analyzed and acted upon, for example, via the process 1300 shown in FIG. 13. Additionally, or alternatively, a human user may observe this discrepancy from the visual representations 1500A and 1500B and issue manual instructions based on the observation. For example, the human user may determine (e.g., based on personal experience) that the discrepancy between the line patterns 1510A and 1510B represents a significant level of risk, and may manually submit a request for a QC action.

In some embodiments, various techniques may be employed to assist the human user in making the visual comparisons. For example, the location information used to render line patterns may be suitably filtered, interpolated, smoothed or otherwise processed, to enhance the appearance of the line patterns. Additionally, features corresponding to field data (e.g., line patterns 1510A, 1512A, 1514A and 1516A shown in FIG. 15) and features corresponding to reference data (line patterns 1510B, 1512B, 1514B and 1516B shown in FIG. 15) may be differentiated in a display field in any of a variety of manners (e.g., different line types, symbols or patterns; different colors or shades of related colors; different vertical planes of display, etc.) to allow for visual perception of both the field data and the reference data.

To this end, in one embodiment, each of the field data and the reference data, if present in a computer-aided visual rendering, as well as any constituent information forming part of the field data and the reference data, may be displayed as separate "layers" of the visual rendering, such that a viewer of the visual rendering may turn on and turn off displayed data based on a categorization of the displayed data. For example, all field data may be categorized generally under one layer designation (e.g., "Field" or "Current"), and independently enabled or disabled for display (e.g., hidden) accordingly. Similarly, all reference data may be categorized generally under another layer designation (e.g., "Reference" or "Historical") and independently enabled or disabled for display accordingly. Respective layers may be enabled or disabled for display in any of a variety of manners; for example, in one implementation, a "layer directory" or "layer legend" pane may be included in the display field (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "Field," different facility types that may have been marked (and indicated in the field data by color, for example) may be categorized under different sub-layer designations (e.g., "Field—Electric;" "Filed—Gas;" etc.); in this manner, a viewer may be able to hide the electric field data while viewing the gas field data, or vice versa, in addition to having the option to view or hide all field data. Sub-layer designations similarly may be employed for the reference data (e.g., "Reference—water/sewer;" "Reference—CATV"). Virtually any characteristic of the information available for display may serve to categorize the information for purposes of displaying layers or sub-layers.

V. Conclusion

In sum, some or all of the contents of an electronic record of a current locate and/or marking operation may be compared to some or all of the contents of a reference electronic record. For example, in some illustrative embodiments, the reference electronic record may comprise data derived from or relating to one or more previous (or "historical") locate and/or marking operations conducted at the same work site as the current locate and/or marking operation. The types of data being compared between the current electronic record and the reference electronic record may include geographic information, facility type information, and/or other information relating to the facilities identified and/or marked during the current and historical locate and/or marking operations. For example, the comparison may generally involve determining whether there is agreement between the current locate and/or marking operation and the historical locate and/or marking operation, which may in turn involve identifying at least one correspondence or discrepancy between the compared data, and in some instances a degree of correspondence.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of "or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for automatically assessing a quality of a first locate and marking operation performed by a field technician using locating equipment to identify a presence or an absence of at least one underground facility at a work site of proposed excavation so as to facilitate mitigation of damage to the at least one underground facility during subsequent excavation activities performed at the work site, the first locate and marking operations being performed by the field technician in response to a locate request ticket that specifies the work site of the proposed excavation, the apparatus comprising:
   at least one piece of locating equipment;
   a memory storing processor-executable instructions;
   at least one I/O interface;
   at least one display device;
   a processor communicatively coupled to the at least one piece of locating equipment, the memory, the at least one display device, and the at least one I/O interface, wherein upon execution of the processor-executable instructions, the processor:
   A) performs electronic comparisons:
      A1) current facility type information relating to an underground facility identified during a first locate and marking operation and generated by the locating equipment, and historical facility type information related to at least one previously-performed historical locate and marking operation, so as to identify a first discrepancy between the current facility type information and the historical facility type information;
      A2) current facility location information related to an underground facility identified during a first locate and marking operation and generated by the locating equipment, and historical facility location information relating to at least one previously-performed historical locate and marking operation, so as to identify a second discrepancy between the current facility location information and the historical facility location information;
   B) automatically generates, based on the comparison in A1) and A2), at least one quality assessment indication for a quality assessment of the first locate and marking operation, adjusting the quality assessment more negatively for the first discrepancy relating to facility type information than on the second discrepancy relating to facility location information;
   C) electronically stores in the memory, and/or electronically transmits to at least one entity associated with the locate and marking operation or the excavation activities, via the at least one I/O interface, the at least one quality assessment indication to provide an electronic record of the quality assessment of the first locate and marking operation so as to facilitate the mitigation of damage to the at least one underground facility during the excavation activities performed at the work site; and
   D) displays the at least one quality assessment indication on the at least one display device.

2. The apparatus of claim 1, wherein in C), the processor: transmits at least one feedback message to the field technician prior to completion of the first locate and marking operation, the feedback message being generated based at least in part on the at least one quality assessment indication generated in B).

3. The apparatus of claim 1, wherein first information relating to the at least one underground facility identified during the first locate and marking operation is generated by the locating equipment used to perform the first locate and marking operation, wherein the locating equipment comprises at least one of a user device, a marking device, and a combined locate and marking device, and wherein prior to A), the processor:
   receives the first information from the locating equipment, wherein the first information includes at least marking information relating to the first locate and marking operation.

4. The apparatus of claim 3, wherein the at least one of the user device, the marking device and the combined locate and marking device includes the processor.

5. The apparatus of claim 3, wherein A), B), and C) are performed during or immediately following the first locate and marking operation, and wherein the processor:
   E) alters at least one operating characteristic of the locating equipment based on the at least one indication of the quality assessment.

6. The apparatus of claim 5, wherein the at least one indication of the quality assessment comprises a numeric score indicative of the quality of the first locate and marking operation, and wherein the processor:
   E1) alters the at least one operating characteristic of the locating equipment if the numeric score is below a predetermined threshold.

7. The apparatus of claim 5, wherein in the E) processor disables the locating equipment if the at least one indication of the quality assessment is unsatisfactory.

8. The apparatus of claim 3, wherein the first information further includes at least one of:
   at least one location at which the locating equipment was used to perform the first locate and marking operation;
   marking material type information identifying at least one characteristic of a marking material used for at least one physical locate mark to mark the presence or the absence of the at least one underground facility detected and marked during the first locate and marking operation;
   signal information identifying a signal strength measured by the combined locate and marking device at the location of the at least one underground facility detected during the first locate and marking operation;
   position information identifying an angle or acceleration of the locating equipment during the first locate and marking operation; and
   environmental information describing at least one environmental condition present during the first locate and marking operation.

9. The apparatus of claim 1, wherein prior to A), the processor:
   A1) selects for comparison at least some of the first information and/or at least some of second information based at least in part on a dig area indicator that indicates a dig area of the work site on a digital image.

10. The apparatus of claim 9, wherein in A1), the processor:
    receives, via the at least one I/O interface, geographic coordinates for the dig area indicator; and
    selects the at least some of the first information, and/or the at least some of the second information, that relates only to a geographic area including the geographic coordinates for the dig area indicator.

11. The apparatus of claim 10, wherein the geographic area is within a predetermined radius of the geographic coordinates for the dig area indicator.

12. The apparatus of claim 1, wherein prior to A), the processor:
   obtains the first information from one or more first electronic records relating to the first locate and marking operation, based at least in part on a target of comparison corresponding to one or more aspects of the quality of the first locate and marking operation; and
   obtains the second information from one or more second electronic records relating to at least one second locate and/or marking operation, based at least in part on the target of comparison corresponding to one or more aspects of the quality of the first locate and marking operation.

13. The apparatus of claim 12, wherein the target of comparison based on which the first information and the second information are obtained includes one of:
   type of the at least one underground facility detected and marked during the first locate and marking operation;
   at least one characteristic of at least one physical locate mark placed on the ground, pavement or other surface to mark the presence or the absence of the at least one underground facility during the first locate and marking operation;
   at least one distance or offset between the at least one physical locate mark and at least one environmental landmark in or proximate to the work site;
   a duration of the at least one first locate and marking operation; and
   at least one event logged by the locating equipment used during the first locate and marking operation.

14. The apparatus of claim 13, wherein:
   the first information includes first facility type information relating to a first facility type;
   the second information includes second facility type information relating to the first facility type; and
   in A), the processor compares the first facility type information to the second facility type information to determine whether the first facility type information is consistent with the second facility type information.

15. The apparatus of claim 14, wherein the first facility type information comprises color of the at least one physical locate mark placed on the ground, pavement or other surface to mark the presence or the absence of the at least one underground facility.

16. The apparatus of claim 12, wherein:
   the at least one second locate and marking operation includes a plurality of second locate and marking operations;
   the one or more second electronic records comprise a plurality of second electronic records each corresponding to a different one of the plurality of second locate and marking operations; and
   prior to A), the processor obtains the second information by:
      obtaining at least one piece of information relevant to the target of comparison from each of the plurality of second electronic records so as to collect a plurality of pieces of information; and
      aggregating the plurality of pieces of information obtained from the plurality of second electronic records to obtain the second information.

17. The apparatus of claim 16, wherein the plurality of pieces of information include numerical information, and wherein the processor aggregates the plurality of pieces of information by determining an average of the numerical information.

18. The apparatus of claim 16, wherein a confidence value is associated with each of the plurality of pieces of information, and wherein the processor aggregates the plurality of pieces of information by selecting at least one piece of information from the plurality of pieces of information based on respective confidence values associated with the plurality of pieces of information.

19. The apparatus of claim 12, wherein the target of comparison comprises first location information relating to at least one location at which at least one facility line of the at least one underground facility was detected and marked during the locate and marking operation, and wherein:
   the first geographic information includes a first set of geo-location data points indicating first geographic locations at which the at least one facility line of the at least one underground facility was marked during the first locate and marking operation; and
   the second information includes a second set of geo-location data points indicating second geographic locations at which at least one corresponding facility line of the at least one underground facility was marked during the at least one second locate and marking operation, and wherein in A) the processor:
   A1) compares the first set of geo-location data points with the second set of geo-location data points; and
   A2) determines a distance between each point in the first set and a nearest point in the second set to generate a vector of distances.

20. The apparatus of claim 19, wherein the first set of geo-location data points is expressed in a first reference frame and the second set of geo-location data points is expressed in a second reference frame different from the first reference frame, and wherein the processor transforms at least one of the first set of geo-location data points and the second set of geo-location data points to a common reference frame.

21. The apparatus of claim 19, wherein in B) the processor:
   B1) generates the at least one indication of the quality assessment based, at least in part, on the vector of distances generated in A2).

22. The apparatus of claim 21, wherein in B1) the processor:
   generates the at least one indication of the quality assessment based, at least in part, on a statistical analysis of distance values in the vector of distances.

23. The apparatus of claim 21, wherein in B1) the processor:
   generates the at least one indication of the quality assessment based, at least in part, on a percentage of distance values in the vector of distances that are less than a first threshold.

24. The apparatus of claim 1, wherein in B) the processor:
   generates the at least one quality assessment indication as a score or grade having one of a plurality of possible values.

25. The apparatus of claim 1, wherein in A) the processor:
   provides at least one quality assessment criterion for the second information relating to the at least one second locate and marking operation;
   provides at least two scoring categories for the at least one quality assessment criterion, each scoring category associated with a scoring value or grade;
   for each scoring category provides an expected data value or range of expected data values;
   determines, for the at least one quality assessment criterion, into which of the at least two scoring categories the first locate and marking operation falls by comparing the first information to the expected data value or range of expected data values for at least one of the at least two scoring categories; and assigns to the first locate and marking operation the scoring value or grade associated with the scoring category into which the locate and marking operation falls.

26. In a computer comprising a memory, at least one I/O interface, a processor communicatively coupled to a piece of locating equipment, and at least one display device, a method for automatically assessing a quality of a first locate and marking operation, performed by a field technician using the locating equipment to identify a presence or an absence of at least one underground facility at a work site of proposed excavation so as to facilitate mitigation of damage to the at least one underground facility during subsequent excavation activities performed at the work site, the first locate and marking operation being performed by the field technician in response to a locate request ticket that specifies the work site of the proposed excavation, the method comprising:
- A) performing electronic comparisons, via the processor, of:
  - A1) current facility type information relating to an underground facility identified during a first locate and marking operation and generated by the locating equipment, and historical facility type information related to at least one previously-performed historical locate and marking operation, so as to identify a first discrepancy between the current facility type information and the historical facility type information;
  - A2) current facility location information related to an underground facility identified during a first locate and marking operation and generated by the locating equipment, and historical facility location information relating to at least one previously-performed historical locate and marking operation, so as to identify a second discrepancy between the current facility location information and the historical facility location information;
- B) automatically generating, based on the comparison in A1) and A2), at least one quality assessment indication for a quality assessment of the first locate and marking operation, adjusting the quality assessment more negatively for the first discrepancy relating to facility type information than on the second discrepancy relating to facility location information;
- C) electronically storing in the memory, and/or electronically transmitting to at least one entity associated with the locate and marking operation or the excavation activities, via the at least one I/O interface, the at least one quality assessment indication to provide an electronic record of the quality assessment of the first locate and marking operation so as to facilitate the mitigation of damage to the at least one underground facility during the excavation activities performed at the work site; and
- D) displaying the at least one quality assessment indication on the at least one display device.

27. At least one non-transitory computer-readable storage medium encoded with computer-executable instructions which, when executed by at least one processor, perform a method for automatically assessing a quality of a first locate and marking operation, performed automatically by a field technician using locating equipment, communicatively coupled to the at least one processor, to identify a presence or an absence of at least one underground facility at a work site of proposed excavation so as to facilitate mitigation of damage to the at least one underground facility during subsequent excavation activities performed at the work site, the first locate and marking operation being performed by the field technician in response to a locate request ticket that specifies the work site of the proposed excavation, the method comprising:
- A) electronically comparing:
  - A1) current facility type information relating to the at least one underground facility identified during the first locate and marking operation and generated by the locating equipment, and historical facility type information relating to at least one previously-performed historical locate and marking operation, so as to identify a first discrepancy between the current facility type information and the historical facility type information; and
  - A2) current facility location information relating to the at least one underground facility identified during the first locate and marking operation and generated by the locating equipment, and historical facility location information relating to the at least one historical locate and marking operation, so as to identify a second discrepancy between the current facility location information and the historical facility location information;
- B) automatically generating, based on the comparing in A), at least one quality assessment indication of the first locate and marking operation, wherein the at least one indication of the quality assessment of the first locate and marking operation is adjusted more negatively based on the first discrepancy relating to facility type information than on the second discrepancy relating to facility location information;
- C) electronically storing in a memory, and/or electronically transmitting to at least one entity associated with the locate and marking operation or the excavation activities, via at least one I/O interface, the at least one quality assessment indication to provide an electronic record of the quality assessment of the first locate and marking operation so as to facilitate the mitigation of damage to the at least one underground facility during the excavation activities performed at the work site; and
- D) displaying the at least one quality assessment indication on at least one display device.

* * * * *